United States Patent
Uchiyama et al.

(10) Patent No.: US 11,706,593 B2
(45) Date of Patent: Jul. 18, 2023

(54) TERMINAL DEVICE, METHOD, AND RECORDING MEDIUM

(71) Applicant: Sony Corporation, Tokyo (JP)

(72) Inventors: Hiromasa Uchiyama, Tokyo (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 255 days.

(21) Appl. No.: 16/982,050

(22) PCT Filed: Dec. 25, 2018

(86) PCT No.: PCT/JP2018/047481
§ 371 (c)(1),
(2) Date: Sep. 18, 2020

(87) PCT Pub. No.: WO2019/187423
PCT Pub. Date: Oct. 3, 2019

(65) Prior Publication Data
US 2021/0099847 A1    Apr. 1, 2021

(30) Foreign Application Priority Data
Mar. 27, 2018  (JP) ................................. 2018-059471

(51) Int. Cl.
*H04W 4/40*    (2018.01)
*H04W 16/28*   (2009.01)
(Continued)

(52) U.S. Cl.
CPC ............. *H04W 4/40* (2018.02); *H04W 16/28* (2013.01); *H04W 52/243* (2013.01); *H04W 72/04* (2013.01)

(58) Field of Classification Search
CPC ........... H04W 4/40; H04W 4/44; H04W 4/70; H04W 4/46
See application file for complete search history.

(56) References Cited

U.S. PATENT DOCUMENTS

| 2018/0192443 A1* | 7/2018 | Novlan | ................ H04W 76/11 |
| 2018/0199332 A1* | 7/2018 | Islam | ................ H04W 72/0413 |
| 2018/0242128 A1 | 8/2018 | Kashiwase | |

FOREIGN PATENT DOCUMENTS

| EP | 3637893 A1 | 4/2020 |
| JP | 2015-185956 A | 10/2015 |

(Continued)

OTHER PUBLICATIONS

International Search Report and Written Opinion dated Mar. 19, 2019 for PCT/JP2018/047481 filed on Dec. 25, 2018, 11 pages including English Translation of the International Search Report.

(Continued)

*Primary Examiner* — Khalid W Shaheed
(74) *Attorney, Agent, or Firm* — Xsensus LLP

(57) ABSTRACT

[Problem] Provided is an interference protection mechanism for communications using a transmit beam in a sidelink.
[Solution] A terminal device capable of communication using any communication method classified as vehicle-to-x (V2X) includes: an acquisition unit that acquires first information relating to allocation of a resource pool that can be used by a plurality of terminal devices using the communication method and second information relating to transmit power which is associated with a beam ID of one or a plurality of transmit beams which the terminal devices use in communication using the communication method; a parameter determination unit that determines parameters relating to the transmit beams on the basis of the first information and the second information; and a transmission processing unit that performs packet transmission processing using the communication method on the basis of the determined parameters.

18 Claims, 25 Drawing Sheets

(51) Int. Cl.
*H04W 52/24* (2009.01)
*H04W 72/04* (2023.01)

(56) References Cited

FOREIGN PATENT DOCUMENTS

| | | | | |
|---|---|---|---|---|
| JP | 2016-506681 | A | 3/2016 | |
| JP | 2017-139659 | A | 8/2017 | |
| WO | 2014/050556 | A1 | 4/2014 | |
| WO | 2017/033799 | A1 | 3/2017 | |
| WO | 2017/135455 | A1 | 8/2017 | |
| WO | WO-2017151876 | A1 | 9/2017 | |
| WO | WO-2019008653 | A1 * | 1/2019 | ............ H04B 1/713 |
| WO | WO-2019029814 | A1 | 2/2019 | |
| WO | WO-2020096693 | A | 5/2020 | |

OTHER PUBLICATIONS

Nokia and Nokia Shanghai Bell, "Discussion on sidelink power control," 3GPP TSG-RAN WG1 Meeting No. 90, R1-1714002, Prague, Czech Republic, Aug. 21-25, 2017, 3 pages.

LG Electronics ZTE Intel: "WF on SL TX power control for FeD2D", 3GPP Draft; R1-1714736 WF on SL TX Power Control for FED2D, 3rd Generation Partnership Project (3GPP), Mobile Competence Centre; 650, Route Des Lucioles; F-06921 Sophia-Antipoli s Cedex; France, vol. RAN WG1, No. Prague, Czech Republic; Aug. 21, 2017-Aug. 25, 2017 Aug. 26, 2017 (Aug. 26, 2017), XP051328282, Retrieved from the Internet:URL:http://www.3gpp.org/ftp/tsg ran/WGI RL1/TSGR1_90/Docs/[retrieved Aug. 26, 2017].

* cited by examiner

FIG.15
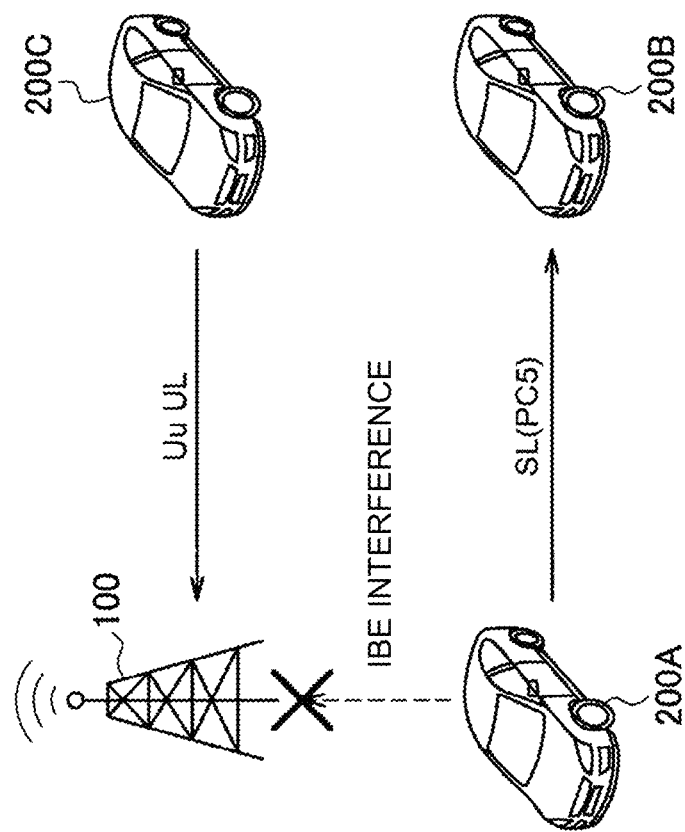
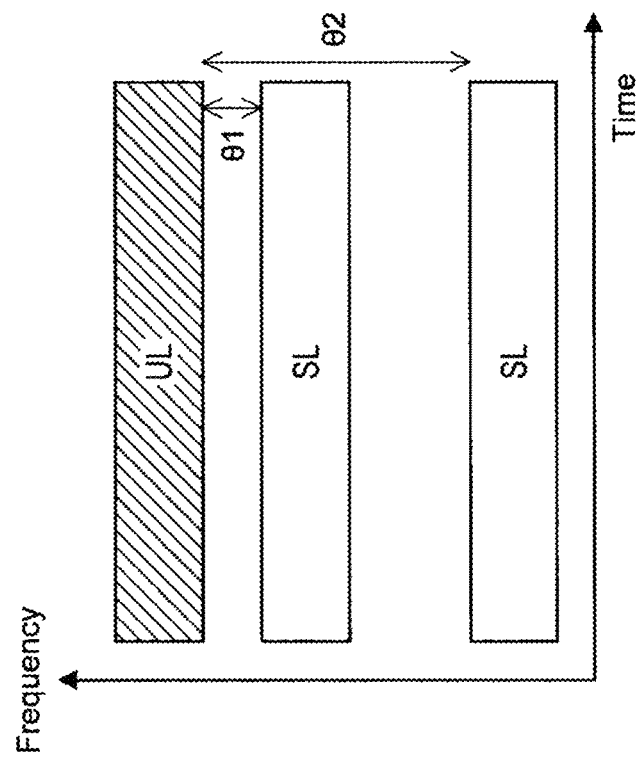

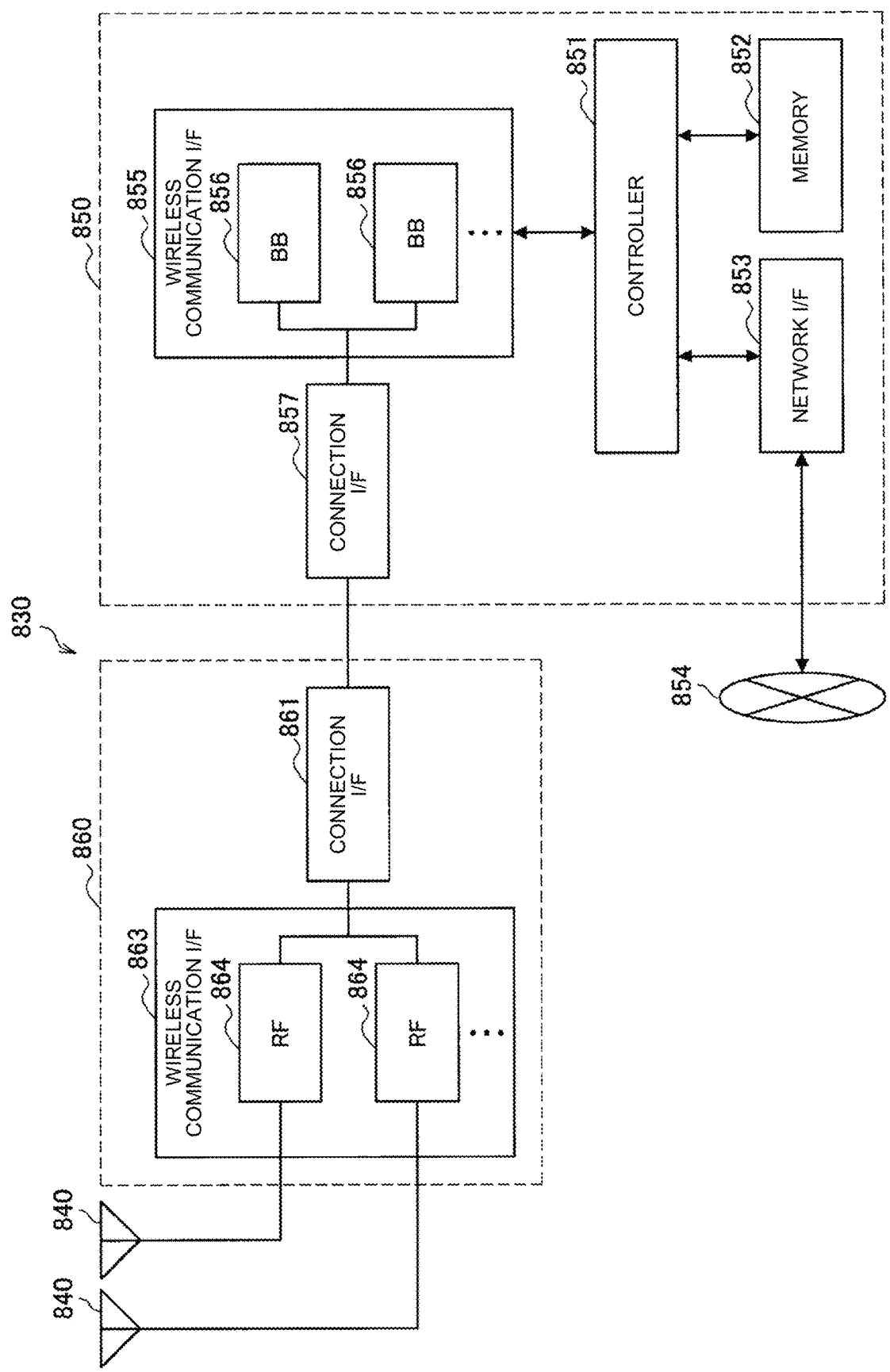

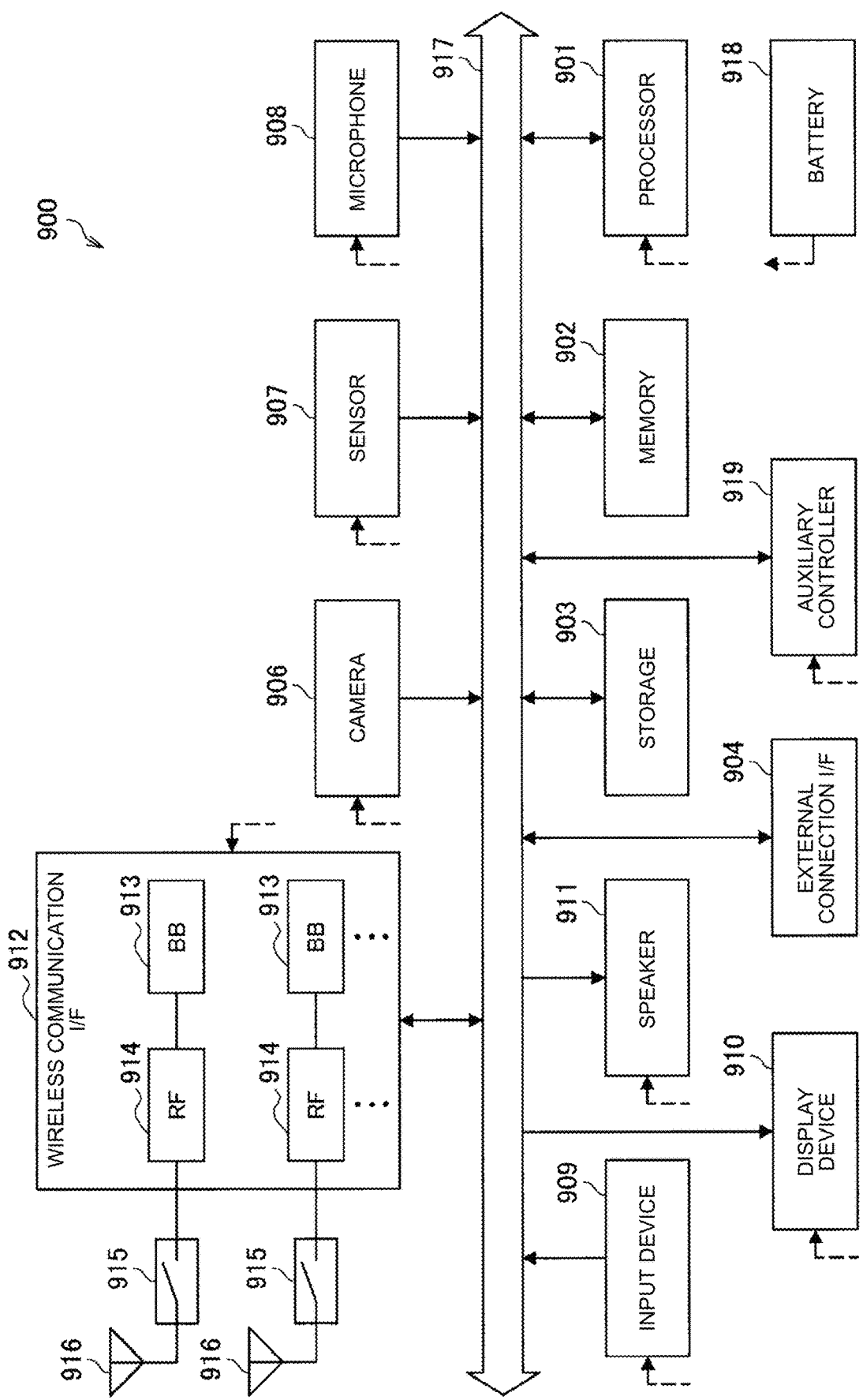

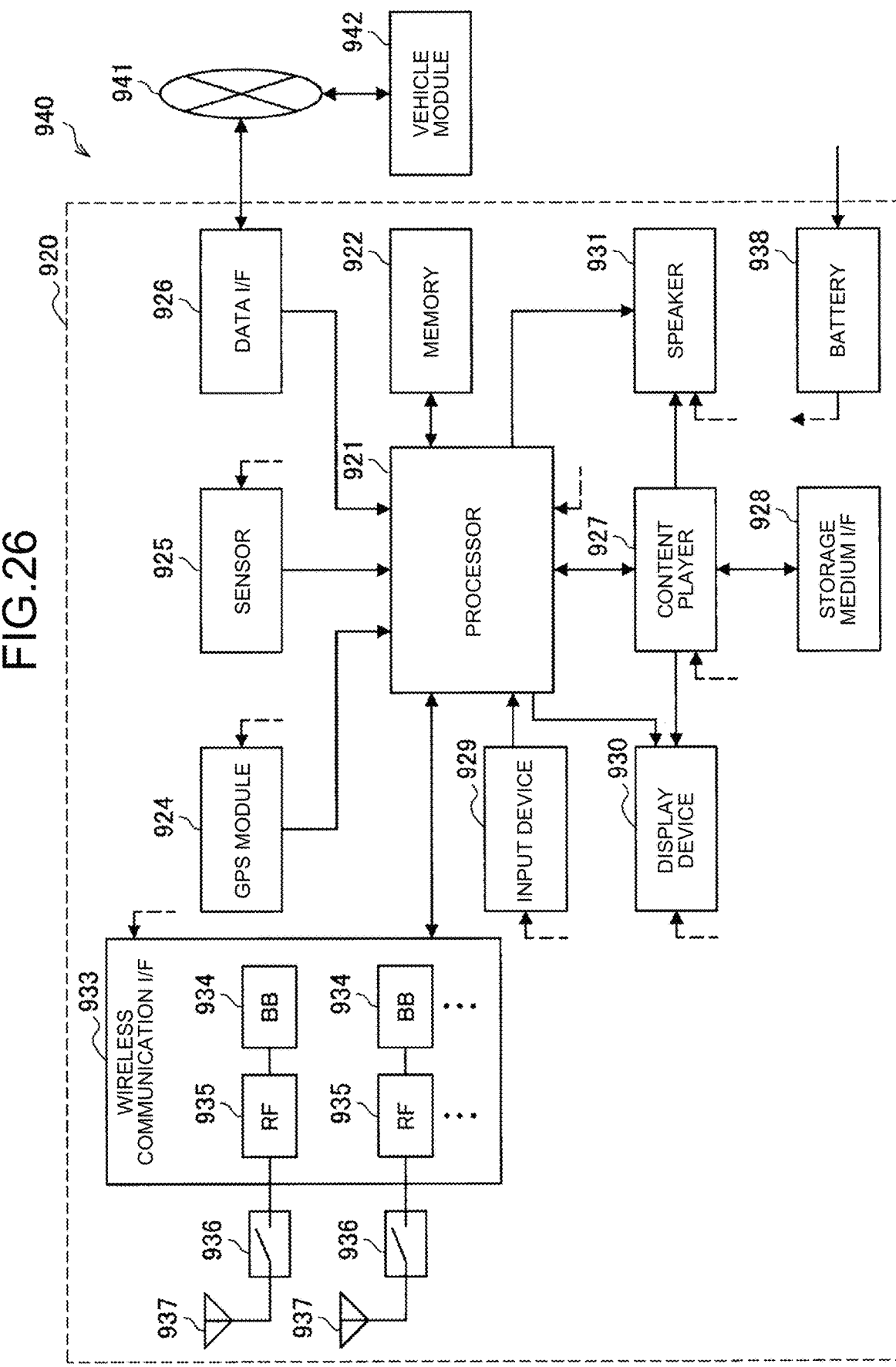

TERMINAL DEVICE, METHOD, AND RECORDING MEDIUM

CROSS-REFERENCE TO RELATED APPLICATIONS

The present application is based on PCT filing PCT/JP2018/047481, filed Dec. 25, 2018, which claims priority to JP 2018-059471, filed Mar. 27, 2018, the entire contents of each are incorporated herein by reference.

FIELD

The present disclosure relates to a terminal device, a method, and a recording medium.

BACKGROUND

In recent years, in addition to communications performed between a base station and a terminal device, communications using a communications link between terminals known as a sidelink have also arrived. Examples of communication using a sidelink are device-to-device (D2D) communication and vehicle-to-X (V2X) communication. For the sake of using use cases such as IoT, MTC, and self-driving, which are predicted to increase going forward, investigations into such communications using a sidelink have been actively pursued.

For example, Patent Literature 1 below discloses a technology for reducing power consumption by controlling the timing for executing V2X communication.

CITATION LIST

Patent Literature

Patent Literature 1: JP 2017-139659 A

SUMMARY

Technical Problem

In communications using a sidelink, it is assumed that signals are broadcast. The same is also true of Patent Literature 1 above. The signals which are broadcast may cause interference to devices other than the communications partner. When a signal is transmitted using beamforming, the interference may be significant. However, there has been no investigation of interference protection in cases where beamforming technology is used in communications using a sidelink.

Therefore, the present disclosure provides an interference protection mechanism for communications using a transmit beam in a sidelink.

Solution to Problem

According to the present disclosure, a terminal device capable of communication using any communication method classified as vehicle-to-x (V2X) is provided that includes: an acquisition unit that acquires first information relating to allocation of a resource pool that can be used by a plurality of terminal devices using the communication method and second information relating to transmit power which is associated with a beam ID of one or a plurality of transmit beams which the terminal devices use in communication using the communication method; a parameter determination unit that determines parameters relating to the transmit beams on a basis of the first information and the second information; and a transmission processing unit that performs packet transmission processing using the communication method on a basis of the determined parameters.

Moreover, according to the present disclosure, a method executed by a terminal device capable of communication using any communication method classified as V2X communication is provided that includes: acquiring first information relating to allocation of a resource pool that can be used by a plurality of terminal devices using the communication method and second information relating to transmit power which is associated with a beam ID of one or a plurality of transmit beams which the terminal devices use in communication using the communication method; determining parameters relating to the transmit beams on the basis of the first information and the second information; and performing packet transmission processing using the communication method on the basis of the determined parameters.

Moreover, according to the present disclosure, a recording medium is provided that is recorded a program for causing a computer, which controls a terminal device capable of communication using any communication method classified as V2X communication, to function as: an acquisition unit that acquires first information relating to allocation of a resource pool that can be used by a plurality of terminal devices using the communication method and second information relating to transmit power which is associated with a beam ID of one or a plurality of transmit beams which the terminal devices use in communication using the communication method; a parameter determination unit that determines parameters relating to the transmit beams on the basis of the first information and the second information; and a transmission processing unit that performs packet transmission processing using the communication method on the basis of the determined parameters.

Advantageous Effects of Invention

As described above, the present disclosure provides an interference protection mechanism for communications using a transmit beam in a sidelink. Note that the foregoing advantageous effect is not necessarily limited and that any of the advantageous effects described in the present specification or other effects that can be understood from the present specification may be provided together with or in place of the above effects.

BRIEF DESCRIPTION OF DRAWINGS

FIG. 15 is an explanatory diagram serving to illustrate an example of transmit power control according to the present embodiment.

FIG. 24 is a block diagram illustrating a second example of an approximate configuration of an eNB.

FIG. 25 is a block diagram illustrating an example of an approximate configuration of a smartphone.

FIG. 26 is a block diagram illustrating an example of an approximate configuration of a car navigation apparatus.

DESCRIPTION OF EMBODIMENTS

Hereinafter, preferred embodiments of the present disclosure will be described in detail with reference to the accompanying drawings. Note that, in the present specification and the drawings, constituent elements which have substantially the same function configuration will be assigned the same reference signs, whereby redundant descriptions will be omitted.

Figure 1:
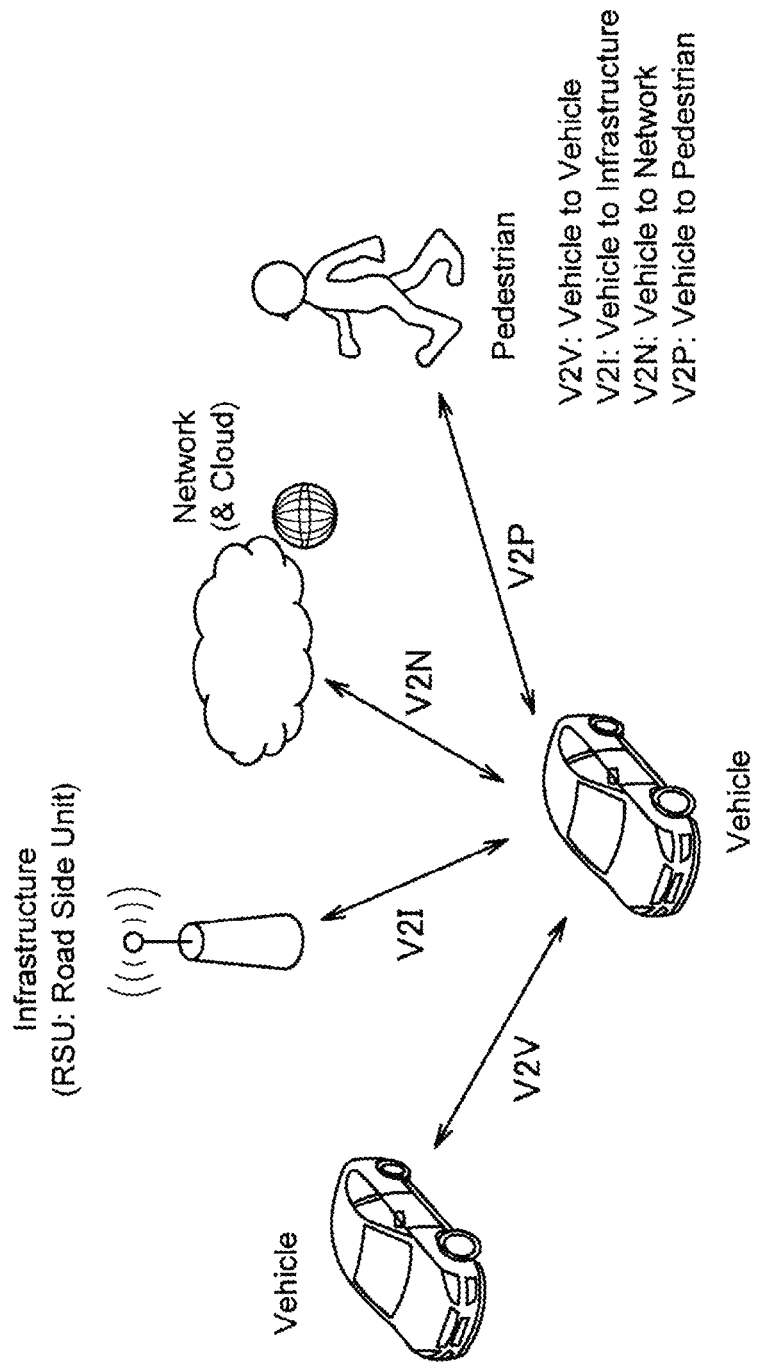
FIG. 1 is an explanatory diagram serving to illustrate an overview of V2X communication.

Note that the description will be provided in the following order.
1. Introduction
 1.1. V2X communication
 1.2. Overview of proposed technology
2. Configuration example
 2.1. System configuration example
 2.2. Base station configuration example
 2.3. Terminal device configuration example
3. Technical features
 3.1. Beamforming taking into account interference to base station
  3.1.1. Technical problem
  3.1.2. First interference suppression processing
  3.1.3. Second interference suppression processing
  3.1.4. Third interference suppression processing
 3.2. Beamforming taking into account interference to peripheral terminals
  3.2.1. Technical problem
  3.2.2. Fourth interference suppression processing
  3.2.3. Fifth interference suppression processing
  3.2.4. Sixth interference suppression processing
4. Application examples
5. Conclusion 1. Introduction <1.1. V2X Communication>
(1) Overview By using a communications device that is installed in a moving body such as a vehicle, direct communication between the moving body and various targets is realized. Communication between a vehicle and various targets is called V2X communication. FIG. 1 is an explanatory diagram serving to illustrate an overview of V2X communication. As illustrated in FIG. 1, V2X communication includes, for example, vehicle-to-vehicle (V2V) communication, vehicle-to-infrastructure (V2I) communication, vehicle-to-nomadic device (V2N) communication, and vehicle-to-pedestrian (V2P) communication. Additionally, although not illustrated, V2X communication also includes vehicle-to-home (V2H) communication, for example. Here, a first character and a third character of V2V communication or the like denote the starting point and the end point, respectively, and do not limit the communication path. For example, V2V communication is a concept that includes moving bodies communicating directly with one another and communicating indirectly via a base station or the like.

V2V communication is communication between moving bodies such as vehicles (more precisely, communications devices installed in the moving bodies). V2I communication is communication between moving bodies and infrastructure referred to as road side units (RSU). V2N communication is communication between moving bodies and cellular networks. V2P communication is communication between moving bodies and pedestrians (more precisely, communications devices held by pedestrians).

Moving bodies such as vehicles and communications devices held by pedestrians will also be referred to as terminal devices hereinbelow. Terminal devices will sometimes be referred to simply as user equipment (UE). RSUs include UE-type RSUs which are mounted in terminal devices and base station-type RSUs which are mounted in base stations.

A wireless interface between a terminal device and infrastructure equipment such as a base station and a base station-type RSU is also called a Uu interface. A communications link of a Uu interface is also called a Uu link or a Uu DL/Uu UL depending on whether same is a downlink (DL) or an uplink (UL). A wireless interface between terminal devices is also called a PC5 interface. A communications link of a PC5 interface is also called a sidelink (SL).

Figure 2:
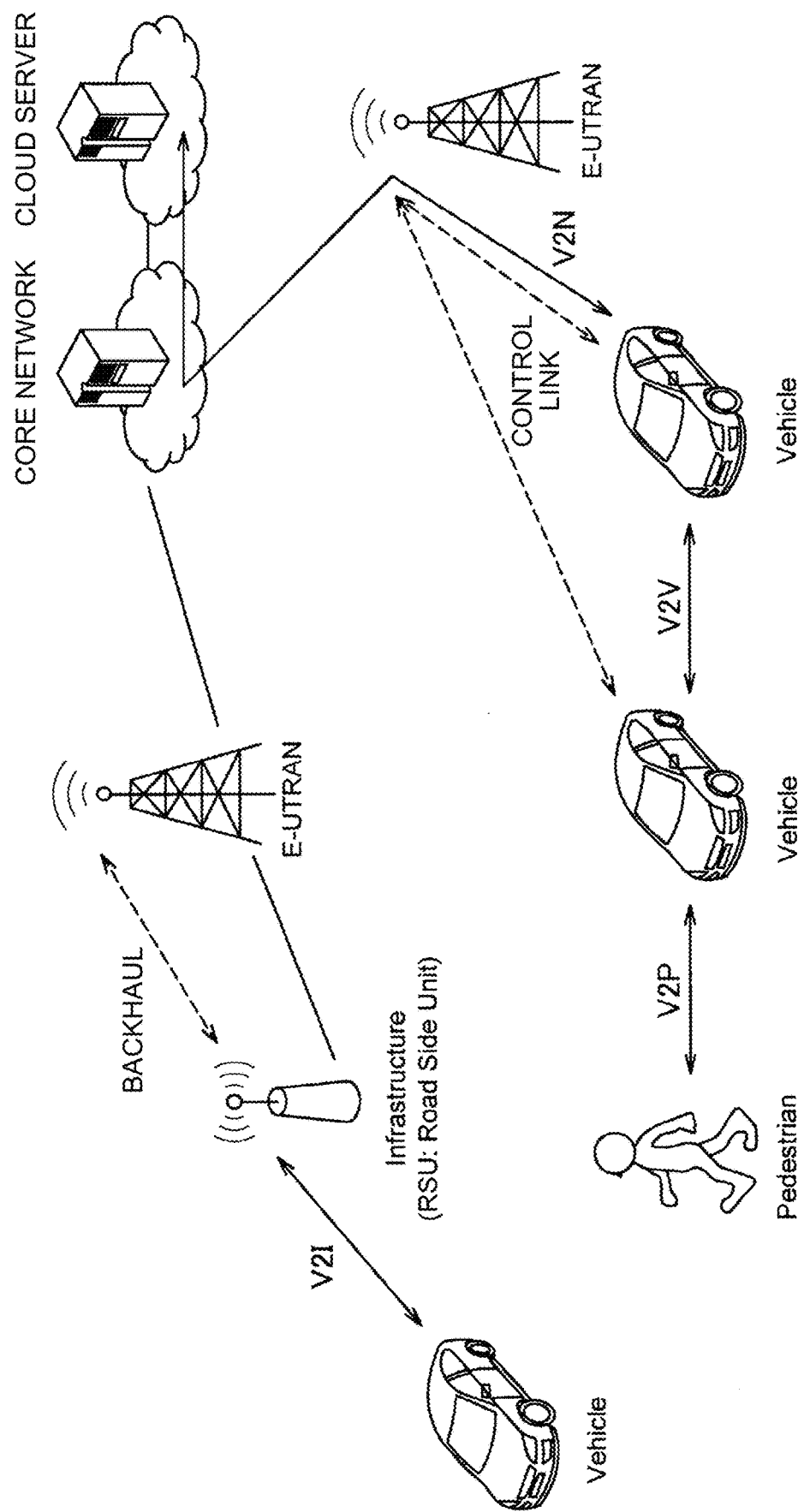
FIG. 2 is an explanatory diagram serving to illustrate an overall picture of V2X communication.

FIG. 2 is an explanatory diagram serving to illustrate an overall picture of V2X communication. As illustrated in FIG. 2, V2X communication may involve moving bodies, pedestrians, RSUs, evolved universal terrestrial radio access (E-UTRAN) (that is, a cellular network base station), a core network and a cloud server. The cloud server holds a V2X application server. The core network performs control of V2X communication. While performing Uu link communication with moving bodies, the base station carries out support such as resource management relating to direct communication such as V2V communication and V2P communication, and communication parameter control. RSUs are classified as base station-type RSUs and UE-type RSUs. RSUs provide V2X applications and provide support such as data relay support.

Note that, for V2X communication, communication systems using 802.11p-based dedicated short range communication (DSRC) have mainly been investigated thus far. However, in recent years, the investigation of communication systems using mobile phone communication standards such as long term evolution (LTE) has been undertaken for V2X communication. In LTE-based V2X communication, support such as the exchange of basic safety messages or the like is provided. Meanwhile, further improvements in V2X communication have been made and, in recent years, investigations of new radio (NR) V2X communication using 5G technology (NR) have been undertaken. Naturally, such technology can also be applied to V2X communication using other communication standards.

(2) Use Cases

Figure 3:
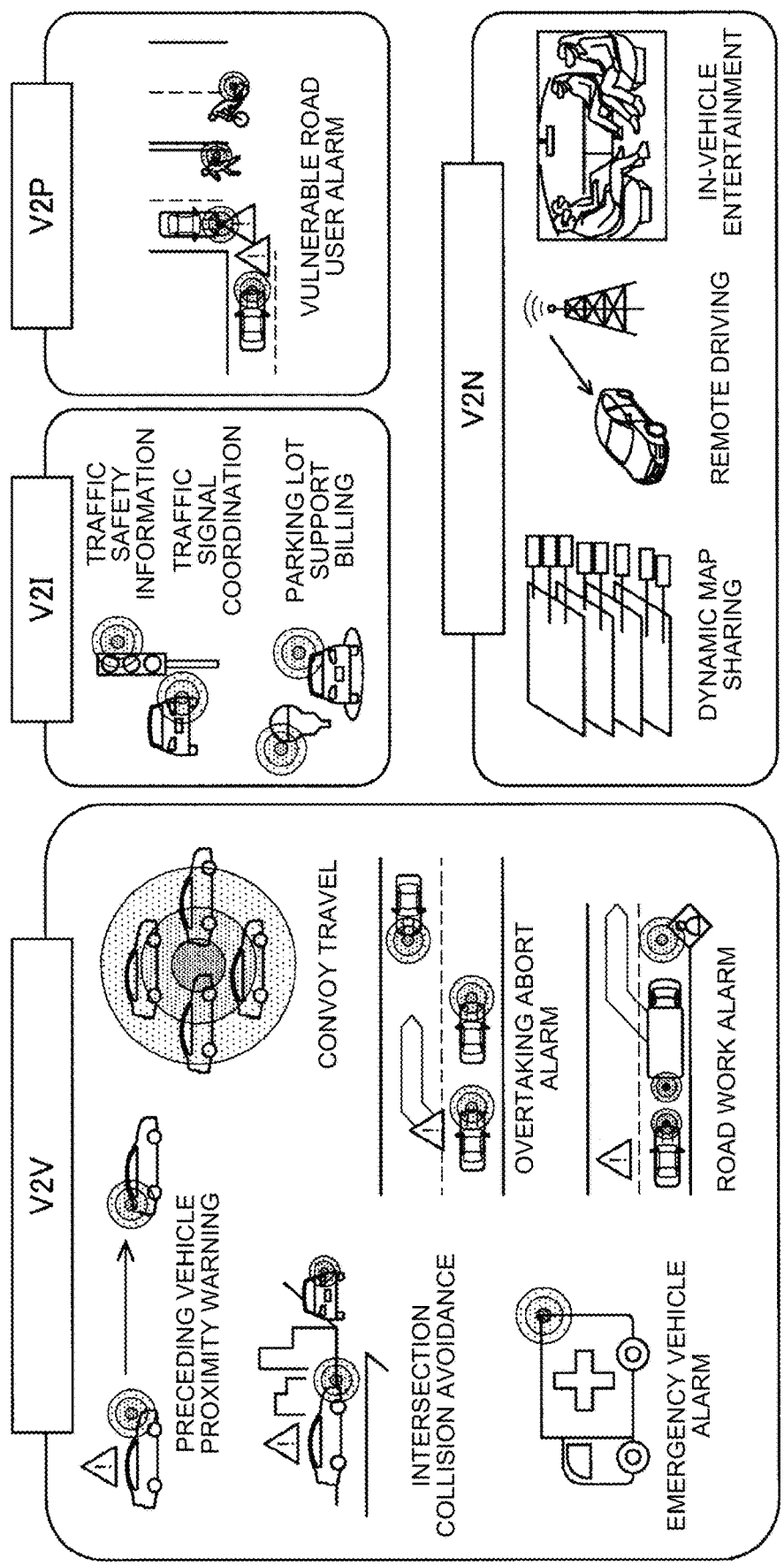
FIG. 3 is an explanatory diagram serving to illustrate use cases for V2X communication.

FIG. 3 is an explanatory diagram serving to illustrate use cases for V2X communication. As illustrated in FIG. 3, possible V2V communication use cases include preceding vehicle proximity warnings, intersection collision avoidance, emergency vehicle alarms, convoy travel, overtaking abort alarms, and road work alarms. Possible V2I communication use cases include the provision of road safety information, traffic signal coordination, and parking lot support billing, and so forth. Possible V2P communication use cases include vulnerable road user alarms. Possible V2N communication use cases include dynamic map sharing, remote driving, and in-vehicle entertainment, and so forth.

Where NR V2X communication is concerned, examples of new use cases which are supported include those that have hitherto not been supported by LTE-based V2X and that require a high degree of reliability, low latency, high-speed communication, and a high capacity, such as, for example, the provision of the dynamic map illustrated in FIG. 3 and remote driving, and so forth. Further use case examples include sensor data sharing where sensor data is exchanged on a vehicle-to-vehicle or a road-to-vehicle basis, or platooning for convoy travel. Such NR V2X communication use cases and requirements are detailed in 3GPP TR22.886. NR V2X communication use cases will be described hereinbelow by way of examples.

Vehicle Platooning

This use case is a convoy travel use case in which a plurality of vehicles form a convoy and travel in the same direction. Information for controlling convoy travel is exchanged between a vehicle leading the convoy and the other vehicles. This exchange of information enables the distance between the vehicles in the convoy to be shortened further.

Extended Sensors

This use case is a use case in which sensor-related information (raw data prior to data processing, or processed data) is exchanged on a vehicle-to-vehicle basis, or the like. Sensor information is collected via local sensors, peripheral vehicles, RSUs, live radio images between pedestrians, and a V2X application server, or the like. By means of this exchange of information, vehicles can obtain information which is not obtained in its own sensor information and are capable of awareness/recognition of a wider range of environments. Because a lot of information may be exchanged, a high data rate is required for such communication.

Advanced Driving

This use case is a use case for semi-autonomous travel or fully autonomous travel. As a result of an RSU sharing awareness/recognition information which is obtained from its own sensors, and the like, with peripheral vehicles, the vehicles are each able to adjust the trajectory and operation of their own vehicle while synchronizing and cooperating with the other vehicles. Each of the vehicles is also able to share its driving purpose and intentions with peripheral vehicles.

Remote Driving

This use case is a use case in which a vehicle is controlled remotely by a remote operator or a V2X application. A remote operation is used instead of a person who is unable to drive or in a hazardous area. For a public transportation system in which a route or a road to be traveled has to some degree been decided, cloud computing-based control can also be employed. A high degree of reliability and a low latency are required for such communication.

(3) Physical Layer Enhancement

In order to achieve the foregoing requirements, additional enhancement of the physical layer beyond LTE V2X is being considered for NR V2X. Wireless interfaces of interest are Uu interfaces and PC5 interfaces.

Examples of the main enhancement items are as follows:

Channel format

Flexible numerology, short transmission time interval (TTI), multiantenna compatibility, waveform, and the like.

Sidelink feedback communication HARQ, channel status information (CSI), and the like.

Sidelink resource allocation scheme

Vehicle position information estimation technology

Terminal-to-terminal relay communication

Support for unicast communication and multicast communication

Multicarrier communication, carrier aggregation

Multiple-input and multiple-output (MIMO)/beamforming

High-frequency compatibility (example: 6 GHz or more), and the like (4) V2X Operation Scenario An example of an operation scenario of V2X communication will be described hereinbelow. Although DL/UL communication between a base station and terminal devices is simple per se in V2N communication, various communication paths may be considered for V2V communication. An example of an operation scenario of V2V communication will be described hereinbelow with reference to FIGS. 4 to 9.

Figure 4:
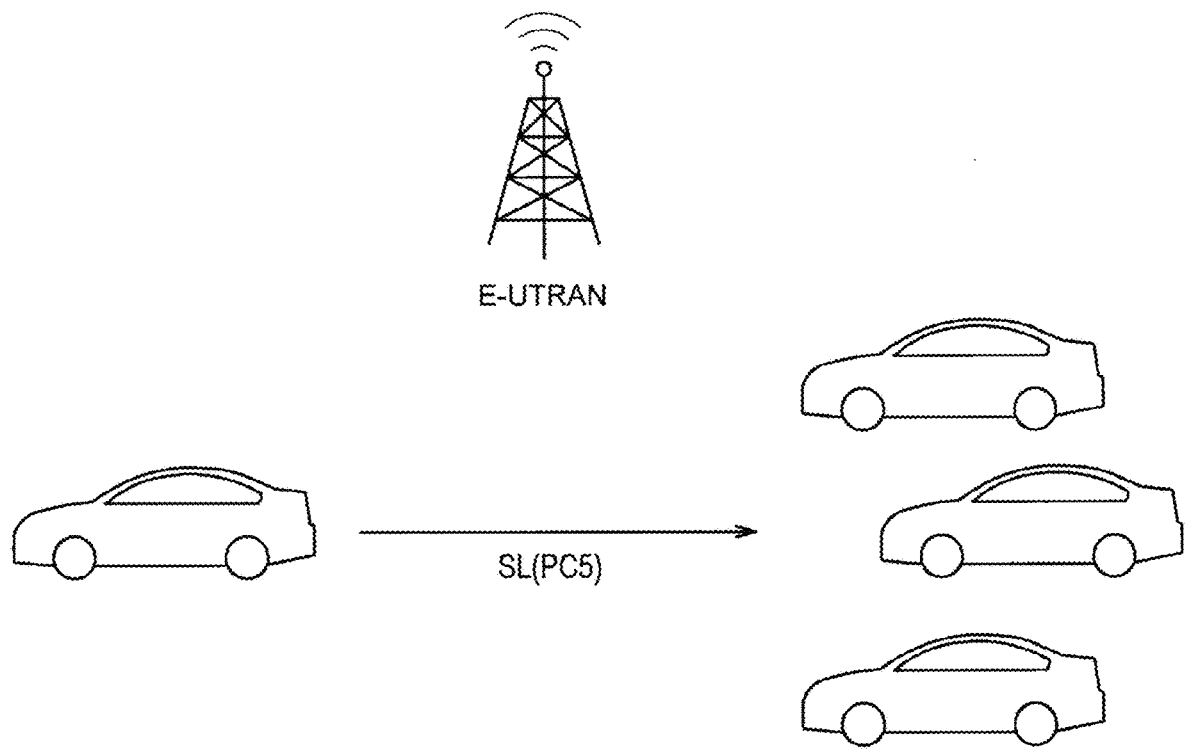
FIG. 4 is an explanatory diagram serving to illustrate a first scenario of V2V communication.

FIG. 4 is an explanatory diagram serving to illustrate a first scenario of V2V communication. In a first scenario, moving bodies such as vehicles perform V2V communication directly. A communications link in this case is also called an SL (that is, a PC5).

Figure 5:
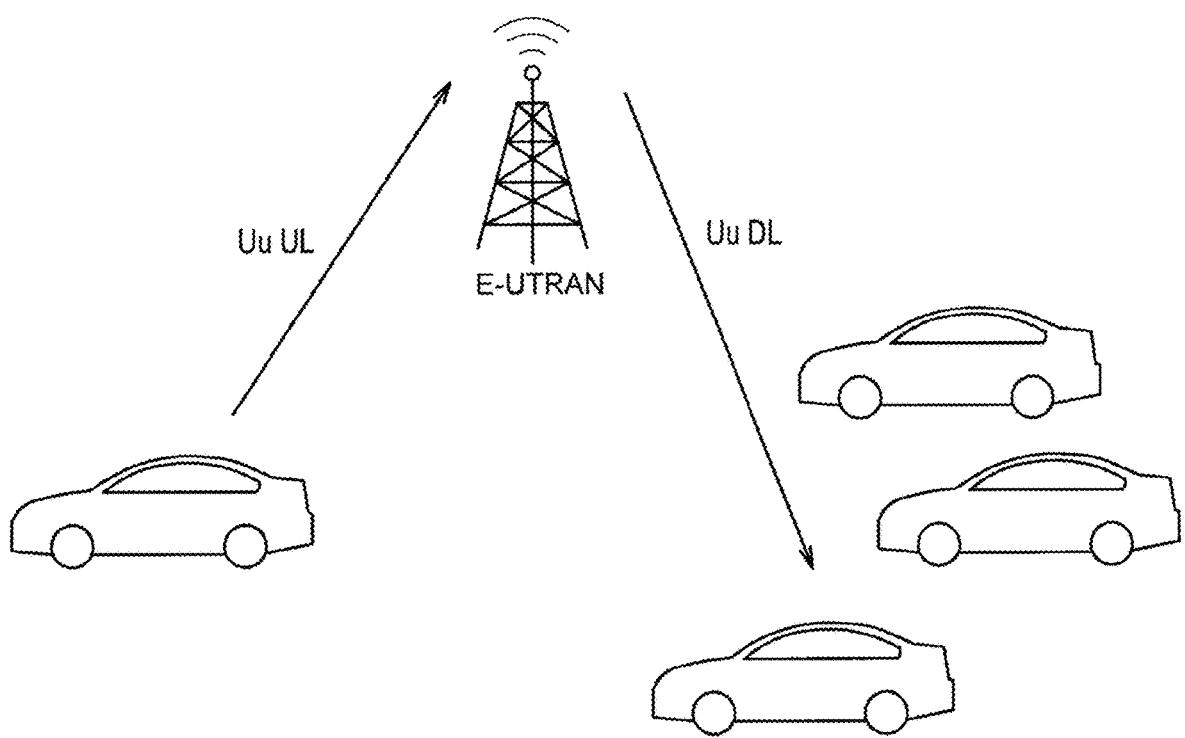
FIG. 5 is an explanatory diagram serving to illustrate a second scenario of V2V communication.

FIG. 5 is an explanatory diagram serving to illustrate a second scenario of V2V communication. In a second scenario, moving bodies such as vehicles perform V2V communication indirectly via an evolved universal terrestrial radio access (E-UTRAN), that is, via a base station. A communications link from the transmitting side to the base station is also called a Uu UL, and a communications link from the base station to the receiving side is also called a Uu DL.

Figure 6:
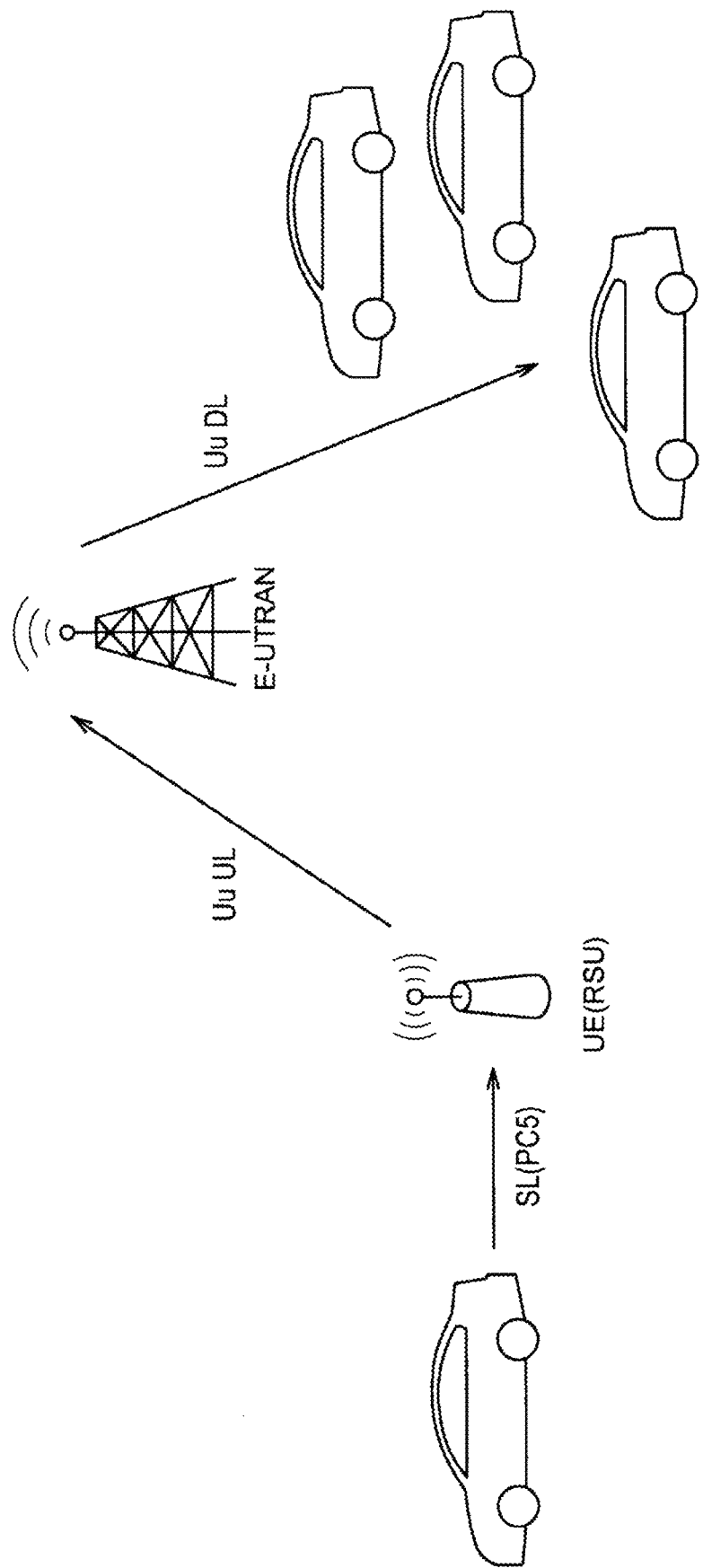
FIG. 6 is an explanatory diagram serving to illustrate a third scenario of V2V communication.

FIG. 6 is an explanatory diagram serving to illustrate a third scenario of V2V communication. In a third scenario, moving bodies such as vehicles transmit signals to the other moving bodies via an RSU or an RSU-type UE, and an E-UTRAN, in that order. A device-to-device communications link is an SL (that is, a PC5), a Uu UL, and a Uu DL, in that order.

Figure 7:
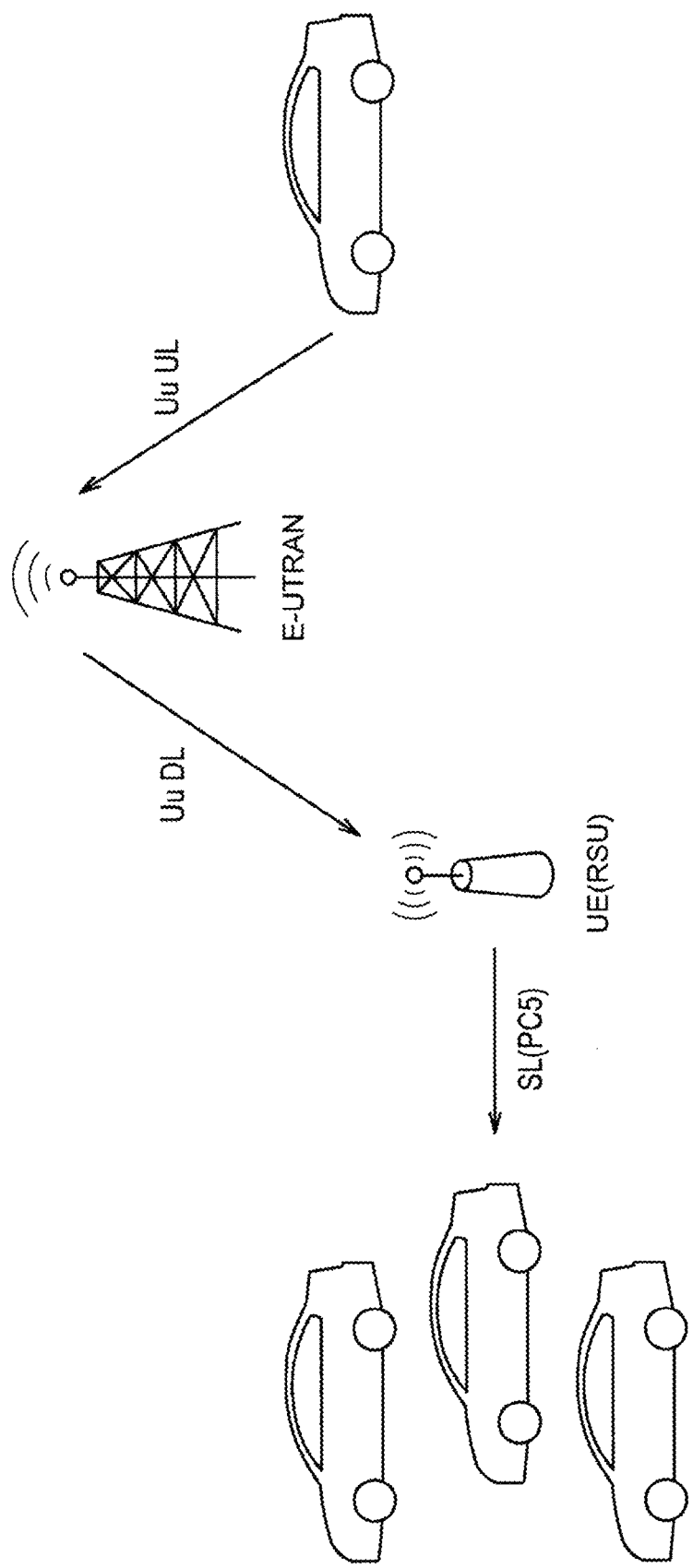
FIG. 7 is an explanatory diagram serving to illustrate a fourth scenario of V2V communication.

FIG. 7 is an explanatory diagram serving to illustrate a fourth scenario of V2V communication. In a fourth scenario, moving bodies such as vehicles transmit signals to the other moving bodies via an E-UTRAN, and an RSU or an RSU-type UE, in that order. A device-to-device communications link is a Uu UL, a Uu DL, and an SL (that is, a PC5), in that order.

Figure 8:
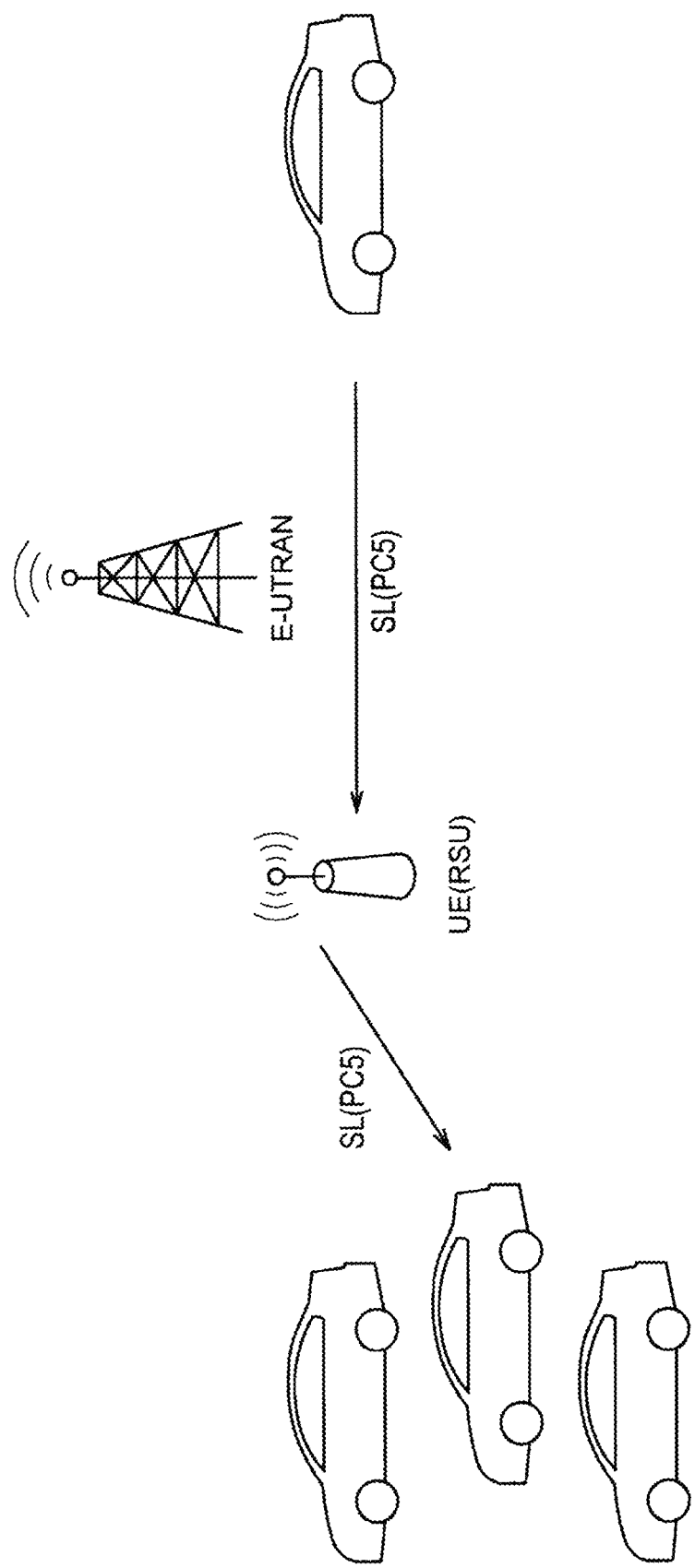
FIG. 8 is an explanatory diagram serving to illustrate a fifth scenario of V2V communication.

FIG. 8 is an explanatory diagram serving to illustrate a fifth scenario of V2V communication. In a fifth scenario, moving bodies such as vehicles perform V2V communication indirectly via an RSU or an RSU-type UE. A communications link between a moving body and an RSU or an RSU-type UE is an SL (that is, a PC5).

Figure 9:
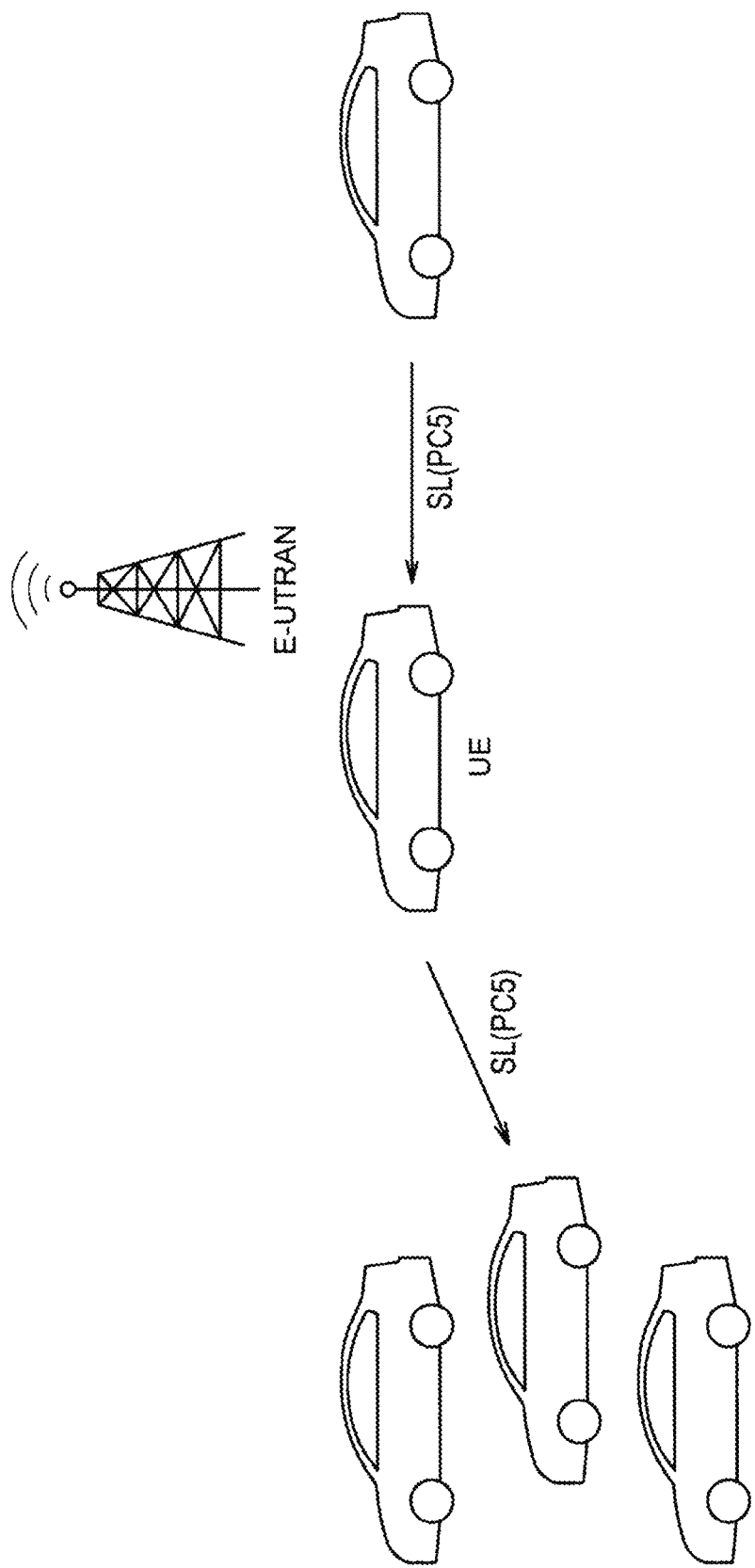
FIG. 9 is an explanatory diagram serving to illustrate a sixth scenario of V2V communication.

FIG. 9 is an explanatory diagram serving to illustrate a sixth scenario of V2V communication. In a sixth scenario, moving bodies such as vehicles perform V2V communication indirectly via a UE. A communications link between a moving body and a UE is an SL (that is, a PC5).

Each of the scenarios described hereinabove becomes a V2P communication scenario when one of the moving bodies is changed to a pedestrian. Similarly, each of the scenarios becomes a V2I communication scenario or a V2N communication scenario when one of the moving bodies is changed to an infrastructure or a network.

<1.2. Overview of Proposed Technology>

The present disclosure proposes technology relating to MIMO beamforming technology in NR V2X communication.

In V2X communication up to now, the usage of single antenna transmission or of transmission diversity, or the like, has basically been performed in a sidelink. However, MIMO and beamforming, which employ a plurality of antennas to send and receive, have not been performed for V2X communication thus far. When beamforming technology is used in a sidelink in particular, interference with respect to the base station and peripheral terminals is desirably taken into account.

Therefore, the present disclosure discloses a mechanism for performing, in sidelink communication using a transmit beam, communication that takes into account interference with respect to the base station and peripheral terminal.

2. Configuration Example 2.1. System Configuration Example

Figure 10:
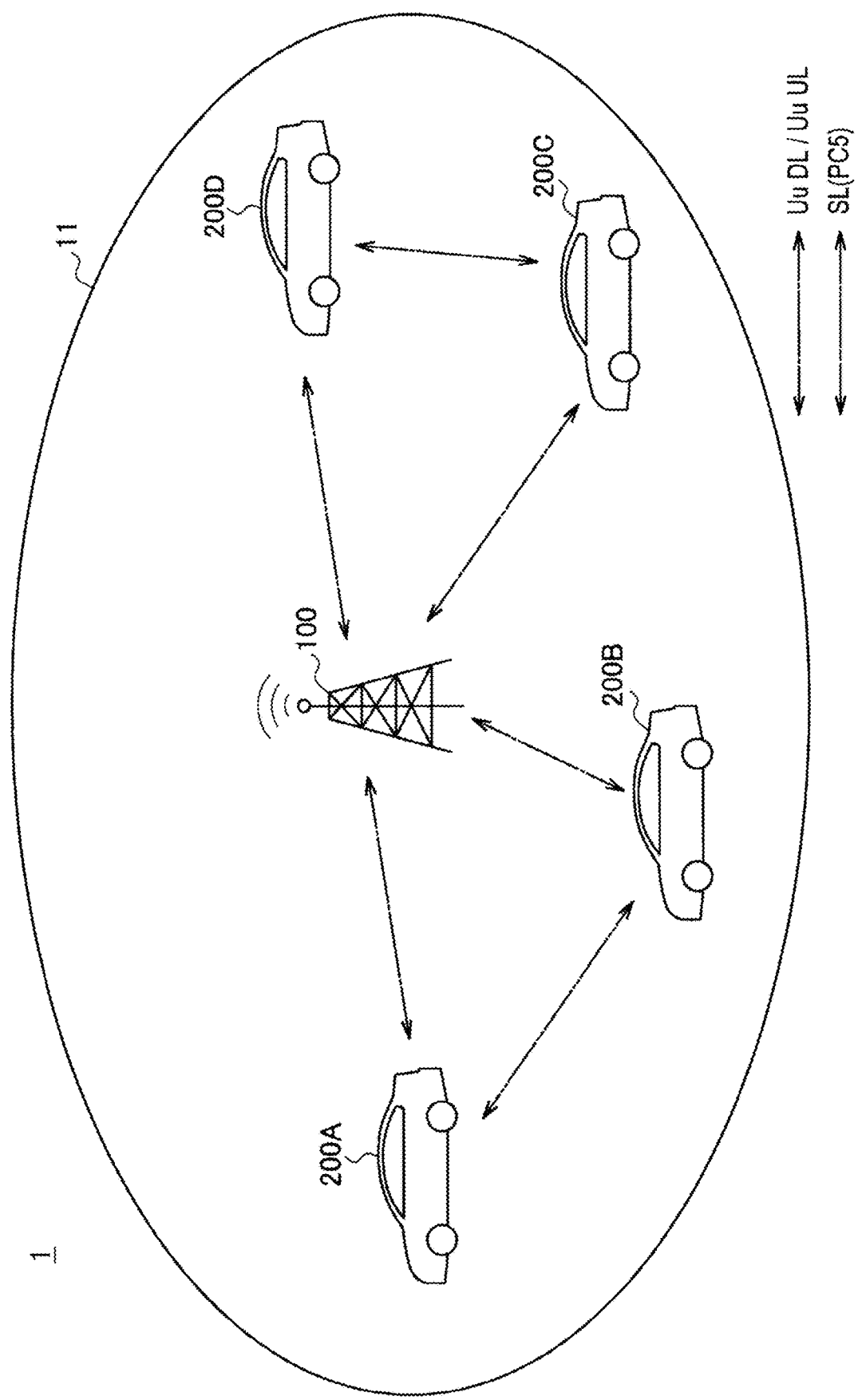
FIG. 10 is an explanatory diagram illustrating a system configuration example according to an embodiment of the present disclosure.

FIG. 10 is an explanatory diagram illustrating a system configuration example according to an embodiment of the present disclosure. As illustrated in FIG. 10, a system 1 according to the present embodiment includes a base station 100 and a plurality of terminal devices 200 (200A to 200D).

The base station 100 is a cellular base station that provides cellular communications services to the terminal devices 200 located in a cell 11. The base station 100 controls V2X communication by the terminal devices 200 located in cell 11. For example, the base station 100 allocates a resource pool for V2X communication to the terminal devices 200. Furthermore, the base station 100 performs support for controlling parameters for transmission by the terminal devices 200. The base station 100 may be a base station-type RSU.

The terminal devices 200 are communications devices of moving bodies such as vehicles, pedestrians, or UE-type RSUs, or the like. The terminal devices 200 are capable of communication using any communication method classified as V2X communication and perform communication on the basis of the control by the base station 100. For example, terminal devices 200A and 200B and terminal devices 200C and 200D, respectively, are able to perform sidelink communication. The terminal devices 200 are able to perform communication using a transmit beam (also referred to as beamforming communication) in a sidelink. The terminal devices 200 are also able to perform uplink communication and/or downlink communication to/from the base station 100.

2.2. Base Station Configuration Example

Figure 11:
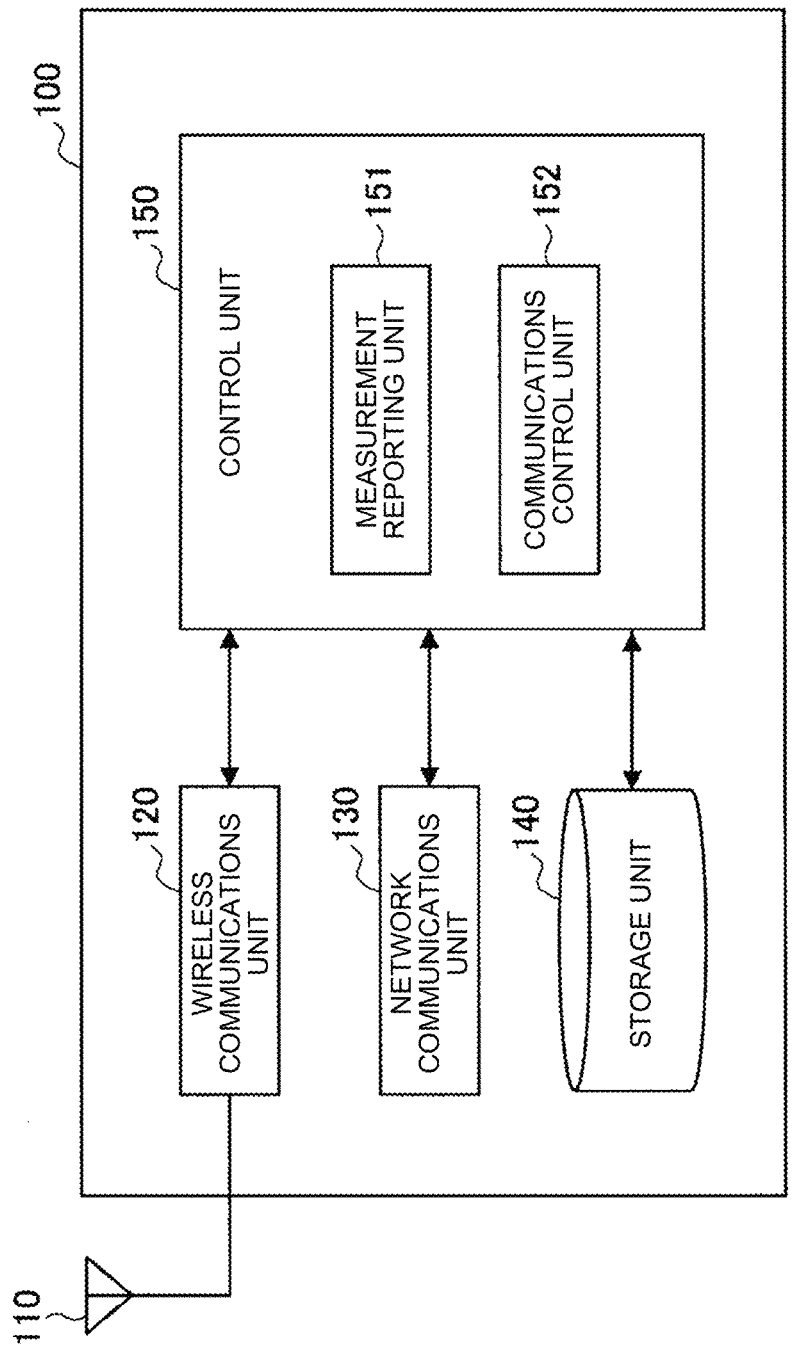
FIG. 11 is a block diagram illustrating an example of a logical configuration of a base station according to the present embodiment.

FIG. 11 is a block diagram illustrating an example of a logical configuration of a base station 100 according to the present embodiment. As illustrated in FIG. 11, the base station 100 according to the present embodiment includes an antenna unit 110, a wireless communications unit 120, a network communications unit 130, a storage unit 140, and a control unit 150.

(1) Antenna Unit 110

The antenna unit 110 radiates a signal output by the wireless communications unit 120 into space as a radio wave. In addition, the antenna unit 110 converts a radio wave in space into a signal and outputs the signal to the wireless communications unit 120.

(2) Wireless Communications Unit 120

The wireless communications unit 120 transmits and receives a signal. For example, the wireless communications unit 120 receives an uplink signal from a terminal device 200 and transmits a downlink signal to the terminal device 200.

(3) Network Communications Unit 130

The network communications unit 130 transmits and receives information. For example, the network communications unit 130 transmits information to other nodes and receives information from the other nodes. For example, the other nodes include other base stations 100 and core network nodes.

(4) Storage Unit 140

The storage unit 140 temporarily or permanently stores various data and a program for operating the base station 100.

(5) Control Unit 150

The control unit 150 provides various functions of the base station 100. For example, the control unit 150 includes a measurement reporting unit 151 and a communications control unit 152.

Measurement Reporting Unit 151

The measurement reporting unit 151 measures signals received from other devices and reports information based on the measurement results. For example, the measurement reporting unit 151 measures an uplink signal which is transmitted using a transmit beam from a terminal device 200 and reports information based on the measurement results to the transmitting terminal device 200. Furthermore, the measurement reporting unit 151 measures an interference amount caused by a sidelink signal which has been transmitted using a transmit beam from a terminal device 200 and reports information based on the measurement results to the transmitting terminal device 200.

Communications Control Unit 152

The communications control unit 152 controls the communication performed by the terminal devices 200 within the cell. For example, the communications control unit 152 controls the transmission parameters of the terminal devices 200 such as allocating a resource pool and performing transmit power control. In addition, the communications control unit 152 relays the exchange of information between the terminal devices 200.

Supplementary Information

Note that the control unit 150 may further include further constituent elements other than these constituent elements. That is, the control unit 150 may also perform operations other than the operations of these constituent elements.

2.3. Terminal Device Configuration Example

Figure 12:
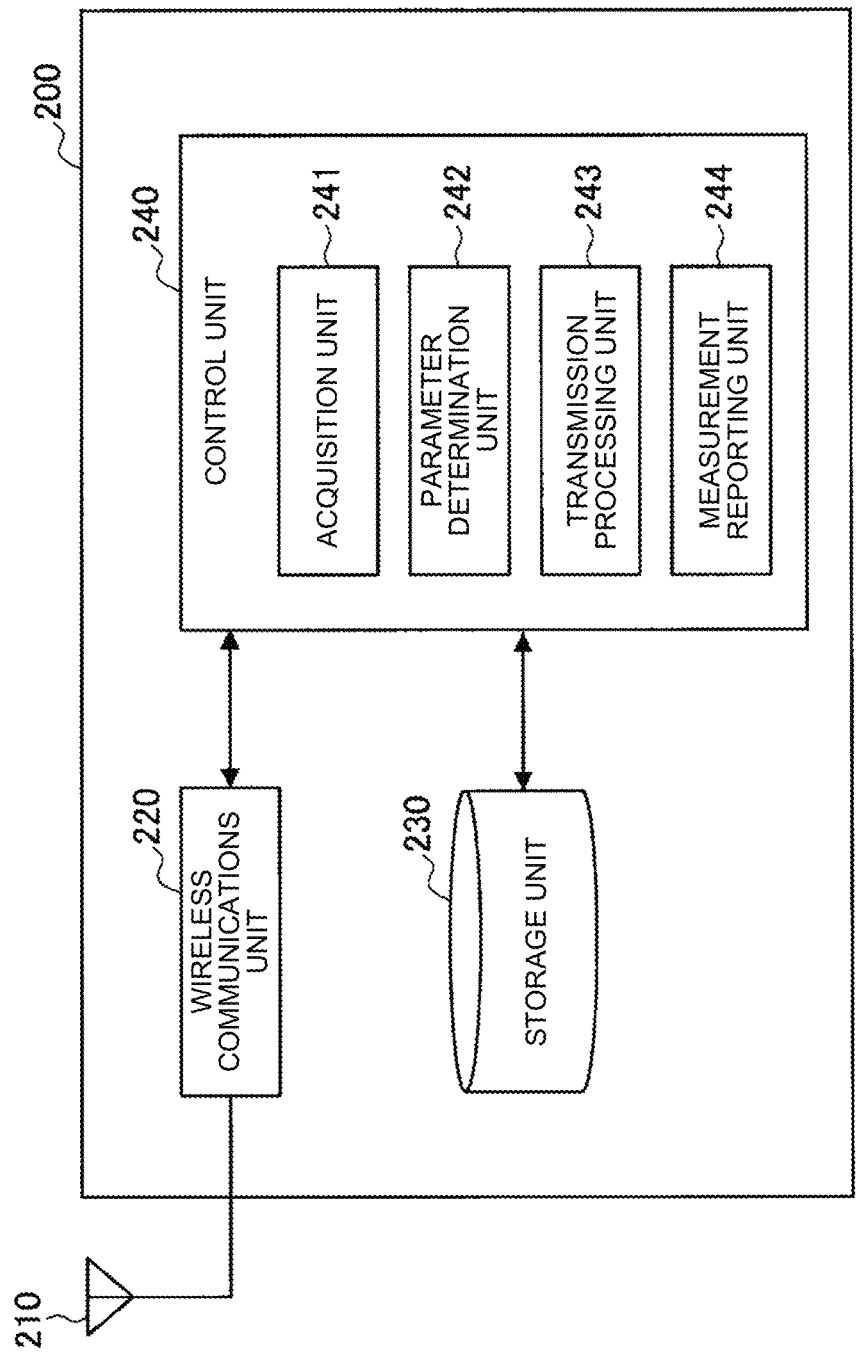
FIG. 12 is a block diagram illustrating an example of a logical configuration of a terminal device according to the present embodiment.

FIG. 12 is a block diagram illustrating an example of a logical configuration of a terminal device 200 according to the present embodiment. As illustrated in FIG. 12, the terminal device 200 according to the present embodiment includes an antenna unit 210, a wireless communications unit 220, a storage unit 230, and a control unit 240.

(1) Antenna Unit 210

The antenna unit 210 radiates a signal, which is output by the wireless communications unit 220, into space as a radio wave. In addition, the antenna unit 210 converts a radio wave in space into a signal and outputs the signal to the wireless communications unit 220.

(2) Wireless Communications Unit 220

The wireless communications unit 220 transmits and receives signals. For example, the wireless communications unit 220 receives a downlink signal from the base station 100 and transmits an uplink signal to the base station 100. Furthermore, the wireless communications unit 220 transmits and receives sidelink signals to/from the other terminal devices 200.

(3) Storage Unit 230

The storage unit 230 temporarily or permanently stores a program for operating the terminal device 200 and various data.

(4) Control Unit 240

The control unit 240 provides various functions of the terminal device 200. For example, the control unit 240 includes an acquisition unit 241, a parameter determination unit 242, a transmission processing unit 243, and a measurement reporting unit 244. The acquisition unit 241, parameter determination unit 242, and transmission processing unit 243 mainly operate when the terminal devices 200 are performing transmission using a transmit beam. However, the measurement reporting unit 244 mainly operates when the terminal device 200 is an interference protection target.

Acquisition Unit 241

The acquisition unit 241 has a function that acquires information for determining transmission parameters.

The acquisition unit 241 acquires information (corresponding to first information) relating to the allocation of a resource pool which can be used by a plurality of terminal devices 200 using a communication method classified as V2X communication. This information is also referred to as resource pool allocation information hereinbelow. The resource pool allocation information is included in system information (a master information block (MIB) or a system information block (SIB)), for example, and is reported from the base station 100.

In the resource pool, resources which are used in sidelink communication (hereinafter also called sidelink resources) and resources which are used in uplink communication (hereinafter also called uplink resources) are configured. The resource pool allocation information may also include information for configuring sidelink resources and uplink resources.

The acquisition unit 241 acquires information (corresponding to second information) relating to transmit power which is associated with the beam IDs of one or a plurality of transmit beams which are used by the terminal devices 200 in communication using a communication method classified as V2X communication. This information is also referred to as transmit power-related information hereinbelow. The transmit power-related information may be acquired from an interference protection target or may be acquired by the terminal device 200 itself. The interference protection target of the transmit power-related information is the base station 100 or another terminal device 200 excluding the transmit destination terminal device 200.

The acquisition unit 241 acquires information (corresponding to third information) which is determined on the basis of the effect of the transmit beam of the terminal device 200 on the interference protection target. This information is also referred to as first interference-related information hereinbelow. The first interference-related information is acquired from the interference protection target. The interference protection target of the first interference-related information is the base station 100 or another terminal device 200 excluding the transmit destination terminal device 200.

The acquisition unit 241 acquires information (corresponding to fourth information) which is determined on the basis of the effect of the transmit beam of another terminal device 200 on the interference protection target. This information is also referred to as second interference-related information hereinbelow. The second interference-related information is acquired from the interference protection target. The interference protection target of the second interference-related information is a terminal device 200 which is a communications partner of the terminal device 200, and the source of interference is a terminal device 200 other than the communications partner of the terminal device 200.

The transmit power-related information and the first and second interference-related information are included in radio resource information (RRC) signaling, system information, or downlink control information (DCI) and can be reported from the base station 100. Furthermore, the transmit power-related information and the first and second interference-related information may be reported by other terminal devices 200 in a sidelink.

Parameter Determination Unit 242

The parameter determination unit 242 determines transmit beam-related parameters (hereinafter also called transmission parameters) on the basis of the information acquired by the acquisition unit 241. More precisely, the parameter determination unit 242 determines, in addition to resource pool allocation information, transmission parameters on the basis of the transmit power-related information and the first interference-related information and/or second interference-related information. At such time, the parameter determination unit 242 may determine the transmission parameters so as to suppress interference to the interference protection target. For example, the parameter determination unit 242 determines parameters relating to at least one of the following:

Transmit Power Control
Beamforming execution or stoppage
Selection or modification of transmit beam used
Selection or modification of resources used
Selection or modification of resource pool used The parameter determination unit 242 determines parameters for communication using a transmit beam in a sidelink on the basis of transmit power-related information which is information relating to the transmit power corresponding to the transmit beam used by the terminal device 200. Thus, even in cases where a terminal device 200 uses beamforming technology in sidelink communication, it is possible to suppress the interference to the interference protection target exerted by the transmit beam of the terminal device 200. The determination of such transmission parameters will be described in detail subsequently as first interference suppression processing.

The parameter determination unit 242 determines parameters for communication using a transmit beam in a sidelink on the basis of the first interference-related information which is determined on the basis of the effect of the transmit beam used by the terminal device 200 on the interference protection target. Thus, even in cases where a terminal device 200 uses beamforming technology in sidelink communication, it is possible to suppress the interference to the interference protection target exerted by the transmit beam of the terminal device 200. The determination of such transmission parameters will be described in detail subsequently as second to fifth interference suppression processing.

The parameter determination unit 242 determines parameters for communication using a transmit beam in a sidelink on the basis of the second interference-related information which is determined on the basis of the effect of the transmit beam used by another terminal device 200 on the interference protection target. Thus, even in cases where another terminal device 200 uses beamforming technology in sidelink communication, it is possible to avoid the communications partner of the terminal device 200 being subject to interference from the other terminal device 200 by controlling the transmission parameters used by the terminal device 200. The determination of such transmission parameters will be described in detail subsequently as sixth interference suppression processing.

Transmission Processing Unit 243

The transmission processing unit 243 performs processing to send packets using a communication method classified as V2X communication, on the basis of the determined transmission parameters. For example, the transmission processing unit 243 performs sidelink communication with the other terminal devices 200 and, for V2X communication via the base station 100, performs uplink communication or downlink communication with the base station 100. This is because the transmission processing unit 243 transmits a signal by using a transmit beam in sidelink communication and uplink communication.

Measurement Reporting Unit 244

The measurement reporting unit 244 measures signals received from other devices and reports information based on the measurement results. For example, the measurement reporting unit 244 measures a sidelink signal which has been transmitted self-addressed using a transmit beam from another terminal device 200 and reports measurement results-based information to the transmitting terminal device 200. Furthermore, the measurement reporting unit 244 measures an interference amount caused by a sidelink signal addressed elsewhere which has been transmitted using a transmit beam from another terminal device 200 and reports information based on the measurement results to the transmitting terminal device 200 or the like.

Supplementary Information

Note that the control unit 150 may further include further constituent elements other than these constituent elements. That is, the control unit 150 may also perform operations other than the operations of these constituent elements.

3. Technical Features

Technical features of the system 1 according to the present embodiment will be described hereinbelow.

Among the terminal devices 200 that perform V2X communication by using a transmit beam, terminal devices 200 on the transmitting side are also called transmission terminals 200, and terminal devices 200 on the receiving side are also called reception terminals 200. Furthermore, when there is no particular need to distinguish a transmission terminal 200 from a reception terminal 200, same will be referred to collectively as the terminal devices 200.

<3.1. Beamforming Taking into Account Interference to Base Station>

<3.1.1. Technical Problem>

Interference Suppression Control in Sidelink Communication

In typical sidelink communications, a portion of the wireless resources for uplink communication (frequency-time resources) are configured as a resource pool for sidelink communication. The terminal devices 200 are capable of performing uplink communication or sidelink communication by using optional resources in the resource pool.

The sidelink resources are orthogonal to the uplink resources with respect to time and/or frequency. However, depending on the positional relationships between the terminal devices 200 and the base station 100, a sidelink signal transmitted by a terminal device 200 close to the base station 100 may, due to the effect of in-band emission (IBE), constitute interference for an uplink signal transmitted by a terminal device 200 which is far from the base station 100. This point will be described with reference to FIG. 13.

Figure 13:
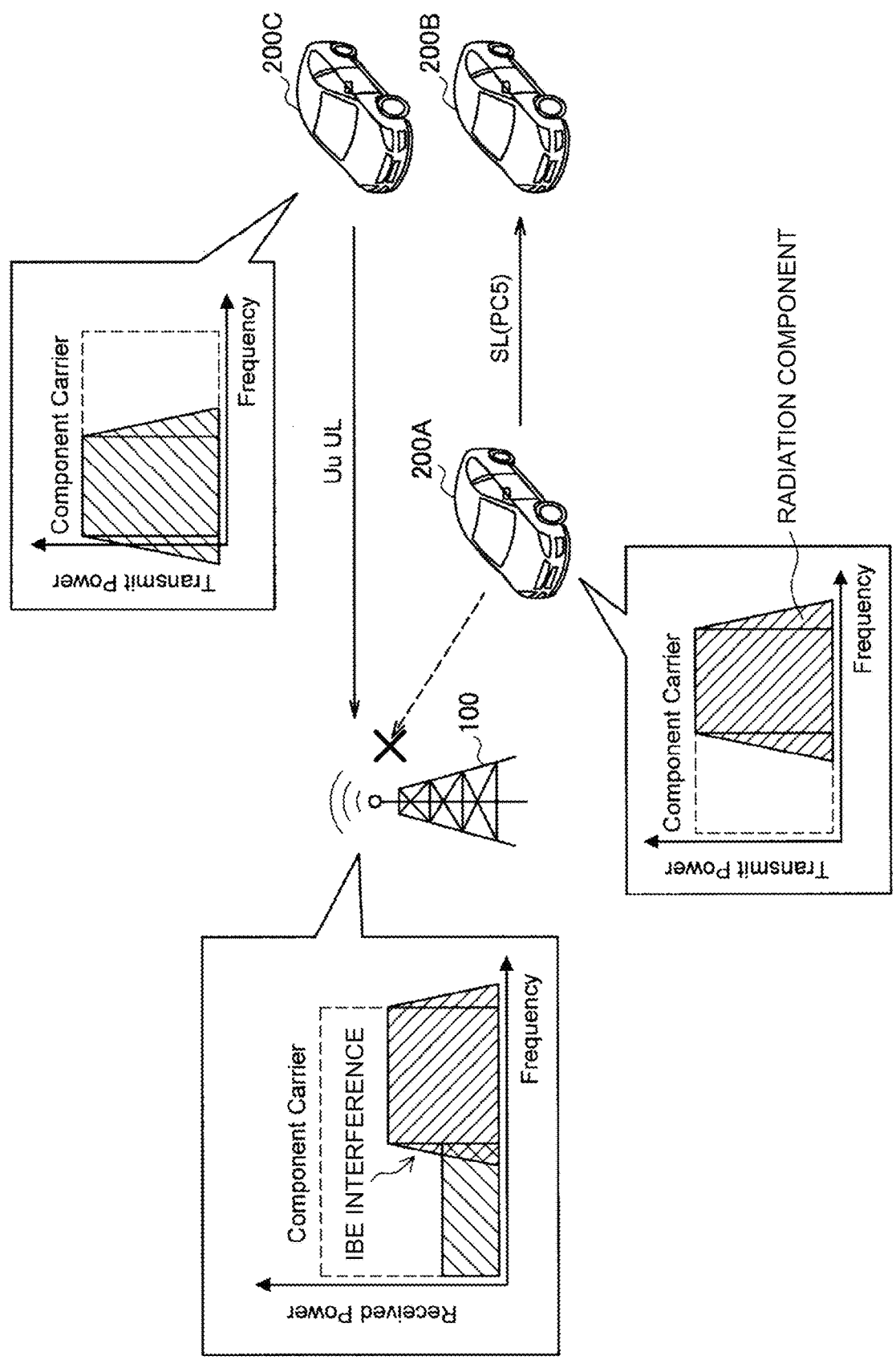
FIG. 13 is an explanatory diagram serving to illustrate typical interference suppression processing which is performed in sidelink processing.

FIG. 13 is an explanatory diagram serving to illustrate typical interference suppression processing which is performed in sidelink processing. FIG. 13 illustrates an aspect in which a sidelink transmission from transmission terminal 200A to reception terminal 200B causes interference to an uplink transmission from terminal device 200C to the base station 100. The left side of FIG. 13 illustrates an example of the resources used for communication, and the right side of FIG. 13 illustrates the positional relationships between each of the communicating devices. In the example illustrated in FIG. 13, transmission terminal 200A is located closer to the base station 100 than terminal device 200C.

Thus, in the base station 100, the sidelink signal from transmission terminal 200A has a greater received power than the uplink signal from terminal device 200C. The sidelink signal from transmission terminal 200A and the uplink signal from terminal device 200C have used resources which are orthogonal to each other in the frequency direction. However, in the base station 100, the radiation component of the sidelink signal from transmission terminal 200A overlaps the uplink signal from terminal device 200C, thereby generating IBE interference.

A typical method for suppressing such interference is a method that performs transmit power control by using pass-loss ((reference signal received power (RSRP), for example) between the base station 100 and the transmission terminal 200. In other words, transmit power control is performed on the transmission terminal 200A close to the base station 100, thereby suppressing the amount of interference to the base station 100.

Case where Beamforming is Performed

When beamforming is used in sidelink communication, it may become difficult to suitably suppress interference to the base station 100 simply by means of the foregoing pass-loss-based transmit power control. This is because, in pass-loss-based transmit power control, the gain due to beamforming is not taken into account. This point will be described with reference to FIG. 14.

Figure 14:
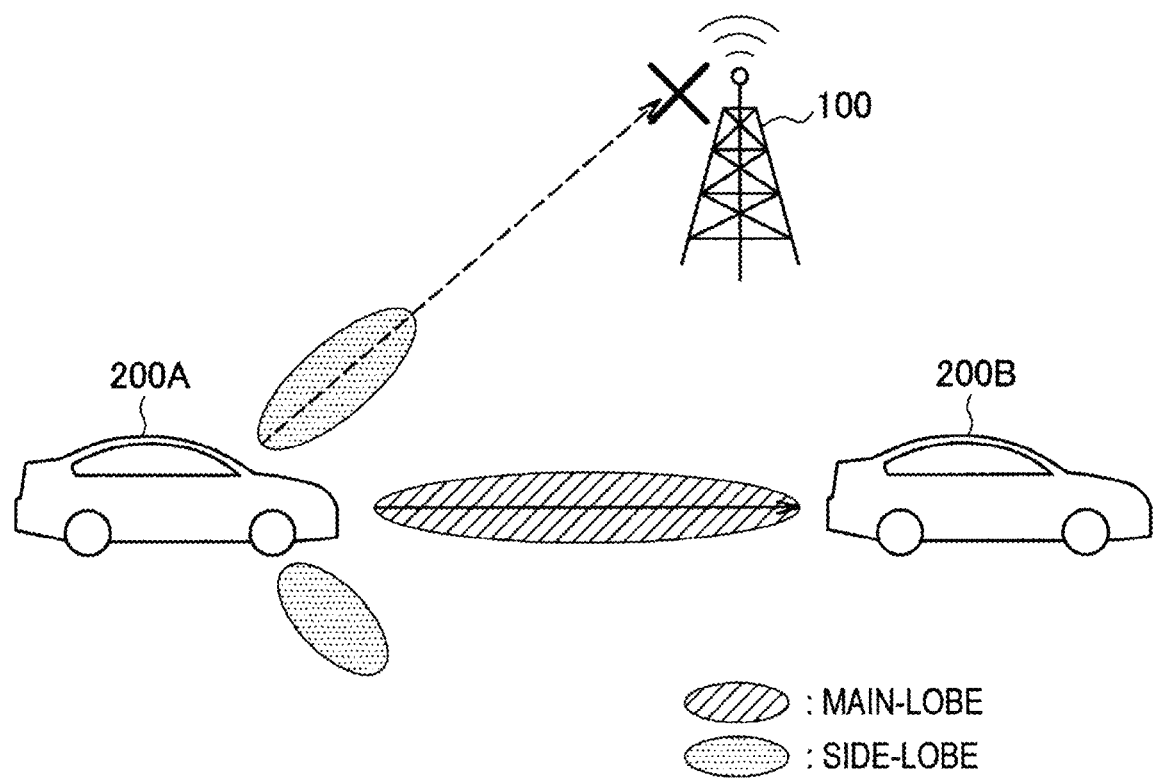
FIG. 14 is an explanatory diagram serving to illustrate an example of interference to a base station in a case where beamforming is performed in a sidelink.

FIG. 14 is an explanatory diagram serving to illustrate an example of interference to the base station 100 in a case where beamforming is performed in a sidelink. FIG. 14 illustrates an aspect in which sidelink transmission using a transmit beam from transmission terminal 200A to reception terminal 200B causes interference to the base station 100. When the transmission terminal 200A has transmitted a sidelink signal by orienting the main lobe (the desired component) of the transmit beam toward reception terminal 200B, the side lobe (the interference component) of the transmit beam is then oriented toward the base station 100, and unexpected interference will likely be generated.

A mechanism for interference suppression control that serves to suppress such interference and that takes into account the gain due to beamforming in sidelink communication is provided hereinbelow. According to the interference suppression processing described hereinbelow, even in cases where a transmission terminal 200 transmits a sidelink signal by using a transmit beam, the amount of interference to the base station 100 can be kept at or below a predetermined amount.

<3.1.2. First Interference Suppression Processing>

In first interference suppression processing, the transmit power control is performed on the basis of the gain which is obtained due to the beamforming by the transmission terminal 200. In this processing, the interference protection target is the base station 100.

(1) Transmit Power Control

The transmission terminal 200 determines the sidelink transmit power as a transmission parameter. For example, the transmission terminal 200 determines the sidelink transmit power using the following equation.

$$\text{The sidelink transmit power} = \min\{P_{MAX}, \alpha+\beta+\gamma+\delta+\theta\} \text{ [dBm]} \quad (1)$$

Here, $P_{MAX}$ is the maximum transmit power for a sidelink of the transmission terminal 200. $\alpha$ is a large component in proportion to the sidelink transmission bandwidth. $\beta$ is a component that corresponds to the received power at the base station 100. $\gamma$ is the pass-loss component between the base station 100 and the transmission terminal 200. $\delta$ is the gain component obtained due to beamforming. $\theta$ is a component that corresponds to the distance in a frequency direction between used resources in the resource pool. These variables may also take negative values.

The decision of whether or not to carry out transmit power control may be made depending on whether or not the frequency of the sidelink communication overlaps with the frequency band (the uplink frequency band, for example) allocated to the base station 100. In this case, equation (1) above is used when the frequency of the sidelink communication overlaps with a portion of the frequency band allocated to the base station 100, and when there is no such overlap, the maximum transmit power $P_{MAX}$ [dBm] for a sidelink of the transmission terminals 200 may be used.

The transmit power in conventional sidelink communication has been determined using $\alpha$, $\beta$, and $\gamma$. $\gamma$ is particularly noteworthy. $\gamma$ is calculated from the transmit power of a reference signal from the base station 100 and the received power (RSRP, for example) at the transmission terminals 200. $\gamma$ grows smaller as the distance between the base station 100 and the transmission terminals 200 increases and grows larger with increased proximity. Note that, according to TS36.213, the transmit power is determined according to the following equation.

if the TPC command field in configured sidelink grant for PSCCH period i is set to 0

$$P_{PSSCH} = P_{CMAX,PSSCH} \quad (2)$$

if the TPC command field in configured sidelink grant for PSCCH period i is set to 1

$$P_{PSSCH} = \min\{P_{CMAX,PSSCH}, 10 \log_{10}(M_{PSSCH}) + P_{O\_PSSCH,1} + \alpha_{PSSCH,1} \cdot PL\}_{[dBm]} \quad (3)$$

However, $\delta$ and $\theta$ are newly introduced in the proposed technology. For example, terms relating to $\delta$ and $\theta$ are introduced to equation (3) above. $\delta$ and $\theta$ are described in detail hereinbelow.

(2) $\delta$ $\delta$ is information relating to the gain with respect to the interference protection target (that is, the base station 100) which is obtained due to the transmit beam. $\delta$ corresponds to the foregoing transmit power-related information. By performing transmit power control on the basis of $\delta$, even when beamforming technology is used in sidelink communication, it is possible to suppress the interference to the interference protection target exerted by the transmit beam of the terminal devices 200.

$\delta$ Determination Method

Various methods for determining $\delta$ may be considered. An example will be described hereinbelow. These determination methods may also be suitably combined.

Determination Based on Beamforming Results

As described hereinbelow, $\delta$ may be calculated on the basis of the value of the gain with respect to the interference protection target (that is, the base station 100), which is obtained due to the transmit beam formed by the transmission terminals 200.

$\delta$ may also be determined on the basis of the results of beamforming between a transmission terminal 200 and a reception terminal 200. That is, $\delta$ may also be determined on the basis of the transmit beam which the transmission terminal 200 uses to transmit to the reception terminal 200. In this case, the transmission terminal 200 carries out beamforming for sidelink transmission to the reception terminal 200 and uses the obtained gain $\delta$ in transmit power control. For example, the maximum gain value which is configured for the sidelink transmit beam is used as the maximum value of δ. Note that the transmit beam which the transmission terminal 200 uses in the sidelink is specified by using a beam ID. The processing in which δ is determined on the basis of the transmit beam which the transmission terminal 200 uses in the sidelink corresponds to option #2 of the sequence illustrated in FIG. 16, described subsequently.

δ may also be determined on the basis of the results of beamforming between a transmission terminal 200 and the base station 100. That is, δ may also be determined on the basis of the transmit beam which the transmission terminal 200 uses to transmit to the base station 100. In this case, the transmission terminal 200 carries out beamforming for an Uu uplink transmission to the base station 100 and uses the obtained gain δ in transmit power control. For example, the maximum gain value which is configured for the Uu uplink transmit beam is used as the maximum value of δ. Note that the transmit beam which the transmission terminal 200 uses in the Uu uplink is specified by using a beam ID. The processing in which δ is determined on the basis of the transmit beam which the transmission terminal 200 uses in the Uu uplink corresponds to option #1 of the sequence illustrated in FIG. 16, described subsequently.

δ may also be the average value of the gain of the transmit beams used by the transmission terminal 200 in a predetermined time interval. For example, δ is configured as the average value of the gain of the transmit beams transmitted by the transmission terminal 200 in sidelinks or Uu uplinks in a predetermined period.

Determination on the Basis of Position Information

δ may also be determined on the basis of position information of the transmission terminal 200. More specifically, δ may also be determined on the basis of the relative positional relationship between the transmission terminal 200 and the base station 100. For example, δ is determined on the basis of zone information of the transmission terminal 200 and zone information of the base station 100. Note that zone information is information indicating positioning in a particular zone among a plurality of preconfigured zones (representing geographical ranges).

Methods for Reporting/Configuring δ

δ may also include a parameter δ1 (corresponding to information relating to a first gain) which is specific to a transmission terminal 200 (that is, UE-specific) and a parameter δ2 (corresponding to information relating to a second gain) which is specific to a cell (that is, Cell specific). δ may also simply be the sum of δ1 and δ2, may be a weighted sum, or may be computed using another optional computation method.

δ1 is configured for each transmission terminal 200 using RRC signaling, for example. A mapping table that associates each of a plurality of beam IDs with a value of δ1 is individually configured, and δ1 may be determined on the basis of the mapping table. More specifically, a transmission terminal 200 refers to the mapping table which has been individually configured for the transmission terminal 200 and determines the δ1 which is associated with the beam ID of the transmit beam being used as the δ1 which is to be used. Otherwise, the base station 100 may also directly configure the δ1 which the transmission terminal 200 should use. Furthermore, the base station 100 may configure the maximum value of δ1 for the transmission terminal 200.

δ2 is configured for the transmission terminal 200 using system information (specifically SIB), for example. δ2 may also be determined on the basis of the distance in the frequency direction between the sidelink resource and the uplink resource in the resource pool. The farther the distance in the frequency direction between the sidelink resource and the uplink resource in the resource pool, the smaller the interference (IBE), and the shorter the distance, the greater the interference. A mapping table that associates each of the plurality of zone information items with a value of δ2 may also be configured.

(3) θ

θ is information relating to the distance in the frequency direction between the sidelink resource and the uplink resource in the resource pool. The farther the distance in the frequency direction, the smaller the interference (IBE), and the shorter the distance, the greater the interference. That is, a greater maximum transmit power may be configured as the distance in the frequency direction increases. However, a smaller maximum transmit power is desirably configured as the distance in the frequency direction shortens. Using such transmit power control, interference in the base station 100 can be suppressed, and in an environment where interference does not readily occur, the SINR can also be improved by increasing the transmit power. This point will be described with reference to FIG. 15.

FIG. 15 is an explanatory diagram serving to illustrate an example of transmit power control according to the present embodiment. FIG. 15 illustrates an aspect in which a sidelink transmission from transmission terminal 200A to reception terminal 200B causes interference to an uplink transmission from terminal device 200C to the base station 100. The left side of FIG. 15 illustrates an example of the resources used for communication, and the right side of FIG. 15 illustrates the positional relationships between each of the communicating devices. The transmission terminal 200A configures a small maximum transmit power when using a sidelink resource at a distance θ1 in the frequency direction from the uplink resource. When, on the other hand, a sidelink resource at a distance θ2 farther than θ1 in the frequency direction from the uplink resource is used, transmission terminal 200A configures a maximum transmit power which is larger than when using the θ1 sidelink resource.

(4) Flow of Processing

Figure 16:
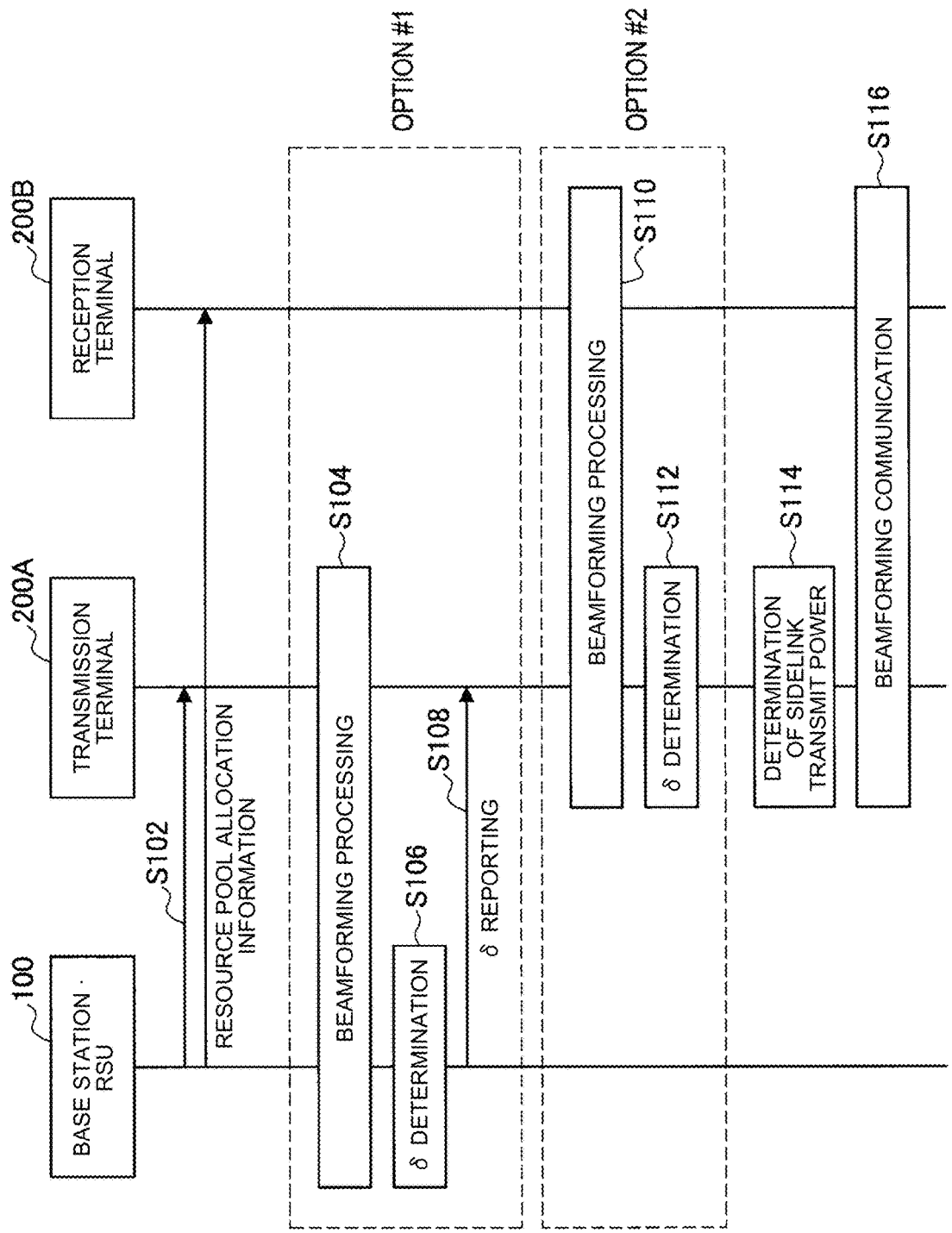
FIG. 16 is a sequence diagram illustrating an example of the flow of first interference suppression processing which is executed in the system according to the present embodiment.

An example of the flow of first interference suppression processing will be described hereinbelow with reference to FIG. 16. FIG. 16 is a sequence diagram illustrating an example of the flow of first interference suppression processing which is executed in the system 1 according to the present embodiment. As illustrated in FIG. 16, this sequence involves the base station 100, transmission terminal 200A, and reception terminal 200B. Note that the base station 100 may be a base station-type RSU.

As illustrated in FIG. 16, the base station 100 first transmits resource pool allocation information to transmission terminal 200A and reception terminal 200B (step S102). Thereafter, either option #1 or #2 is performed.

For option #1, the base station 100 and transmission terminal 200A perform beamforming processing (step S104). More precisely, transmission terminal 200A uses a transmit beam to transmit an uplink signal to the base station 100. Thereafter, the base station 100 computes the gain obtained due to the transmit beam on the basis of uplink signal reception results and determines δ (step S106). The base station 100 then reports the determined δ to transmission terminal 200A (step S108).

For option #2, transmission terminal 200A and reception terminal 200B perform beamforming processing (step S110). More precisely, transmission terminal 200A uses a transmit beam to transmit a sidelink signal to reception terminal 200B. Thereafter, transmission terminal 200A computes the gain obtained due to the transmit beam and determines δ (step S106).

After option #1 or option #1, transmission terminal 200A determines the transmit power of the transmit beam used for transmission of the sidelink signal on the basis of δ, which has been reported or determined (step S114). Thereafter, transmission terminal 200A uses the determined transmit power to perform beamforming communication with the reception terminal 200 (step S116).

(5) Resource Control

A transmission terminal 200 may, in addition to or instead of the foregoing transmit power control, control the resources used for a sidelink. For example, the transmission terminal 200 modifies the resources used in a case where, upon using the transmit power determined by the foregoing transmit power control, it is determined that the desired quality is not satisfied by the packet transmission destination.

The transmission terminal 200 may transmit a resource modification request to the base station 100 and once again receive an allocation by the sidelink resource DCI. Furthermore, by triggering resource reselection, the transmission terminal 200 may once again perform sensing to reselect the resources and perform resource selection.

Where the foregoing determination of quality is concerned, the desired quality may be configured as a threshold value or an optional value may be configured as the threshold value. The value of the threshold value may also be provided by RRC signaling or SIB from the base station 100. The value of the threshold value may be preconfigured in the transmission terminals 200 or may be preconfigured for each frequency band.

<3.1.3. Second Interference Suppression Processing>

In second interference suppression processing, the interference protection target feeds back the effects of beamforming communication between the transmission terminal 200 and the reception terminal 200, to the transmission terminal 200, and the transmission terminal 200 controls the transmission parameters on the basis of the feedback. In this processing, the interference protection target is the base station 100.

(1) Interference Report Information for Sidelink Communication Using a Transmit Beam The base station 100 measures IBE interference due to a sidelink transmission using a transmit beam by the transmission terminal 200. The base station 100 then feeds back information based on the measurement results (also called interference report information hereinbelow) to the transmission terminal 200. The base station 100 may also be triggered to provide feedback when the interference amount exceeds a predetermined threshold value.

The interference report information corresponds to the foregoing transmit power-related information. The interference report information includes measurement results-based information for the interference protection target (that is, the base station 100) about the interference due to sidelink communication using a transmit beam that has been performed between the transmission terminal 200 and reception terminal 200. For example, the interference report information includes at least one of the information indicated below:

Information indicating that a predetermined interference amount has been exceeded Information for transmit power control Request to modify transmit beam used Request to stop beamforming Request to modify resources used Reporting of resource pool modification The information for transmit power control includes a TPC command, for example. A request to modify the resources used includes information requesting modification of the resources used in the allocated resource pool. Reporting of resource pool modification includes information indicating modification of the allocation of the resource pool or information indicating reconfiguration of the resource pool, for example.

The base station 100 generates the foregoing information by measuring interference due to a sidelink transmission using a transmit beam by the transmission terminal 200. This information may be associated with the beam ID of the measured transmit beam.

Interference report information may further include at least one of the information indicated below:

Time-frequency resources for which interference has occurred

IBE interference measurement results

Position information of transmission terminal 200

Direction of travel of transmission terminal 200

Note that IBE interference measurement results may include information indicating the interference amount or may include information indicating the amount by which the interference amount exceeds the threshold value.

(2) Specifying the Feedback Destination

The transmission terminal 200 may allocate resources used in a sidelink from the base station 100. This operational mode is also called mode 3. In the case of mode 3, the base station 100 is capable of specifying a feedback destination because it is possible to ascertain which resource is being used by which terminal device 200.

The transmission terminal 200 may itself select the resources used in sidelink communication from within the allocated resource pool. This operational mode is also called mode 4. In the case of mode 4, it is difficult for the base station 100 to ascertain which resource is being used by which terminal device 200.

Therefore, the terminal device 200 may report, to the base station 100 in advance, capability information indicating whether or not beamforming is carried out in the sidelink and/or whether or not beamforming can be carried out. Alternatively, the base station 100 may report, to the terminal device 200 in advance, whether beamforming is permissible/not permissible in a sidelink. Thus, the base station 100 is capable of ascertaining which resource is being used by which terminal device 200. The terminal device 200 may also report position information to the base station 100 in advance.

(3) Feedback method

When the Feedback Destination can be Specified

When the feedback destination can be specified, the base station 100 feeds back interference report information to the transmission terminal 200 which has been specified as the feedback destination. In this case, RRC signaling or DCI, for example, may be used.

When it is Difficult to Specify the Feedback Destination

When it is difficult to specify the feedback destination, the base station 100 may report interference report information to all the terminal devices 200 that are using a resource pool with which interference occurs. The base station 100 may also report interference report information in association with resource pool allocation information. In this case, SIB may be used, for example. Furthermore, the base station 100 may report resource pool-specific interference report information for each resource pool. In this case, RRC signaling or DCI, for example, may be used.

Further, when it is difficult to specify the feedback destination, the base station 100 may report interference report information to all the terminal devices 200 performing the sidelink communication. In this case, SIB or RRC signaling, for example, may be used.

(4) Control of Transmission Parameters

The transmission terminal 200 controls the transmission parameters on the basis of interference report information which is reported from the base station 100.

The terminal device 200 controls the transmission parameters so that the interference amount to the base station 100 is no more than a predetermined threshold value. The interference to base station 100 can accordingly be suppressed. For example, the transmission terminal 200 determines transmission parameters relating to at least one of the following:

Transmit power control

Stoppage of beamforming

Modification of transmit beam used

Modification of resources used

Modification of resource pool used

For transmit power control, the transmission terminal 200 makes the determination to lower the transmit power. For modification of the transmit beam used, the transmission terminal 200 determines the transmit beam to be modified on the basis of the position information of the transmission terminal 200, the reception terminal 200, and the base station 100. For modification of the resources used and modification of the resource pool used, the transmission terminal 200 performs processing to modify the resources used or the resource pool used so that there is a long distance in the frequency direction from the uplink resource used by the base station 100.

When the transmission parameters are specifically instructed in the interference report information, the transmission terminal 200 determines (that is, applies as is) the transmission parameters in accordance with the instruction.

The transmission terminal 200 may store the interference report information in a database. Further, the terminal device 200 may control the transmission parameters (select the transmit beam, for example) on the basis of the positional relationship between the transmission terminal 200 and the base station 100, and the stored interference report information.

(5) Flow of Processing

Figure 17:
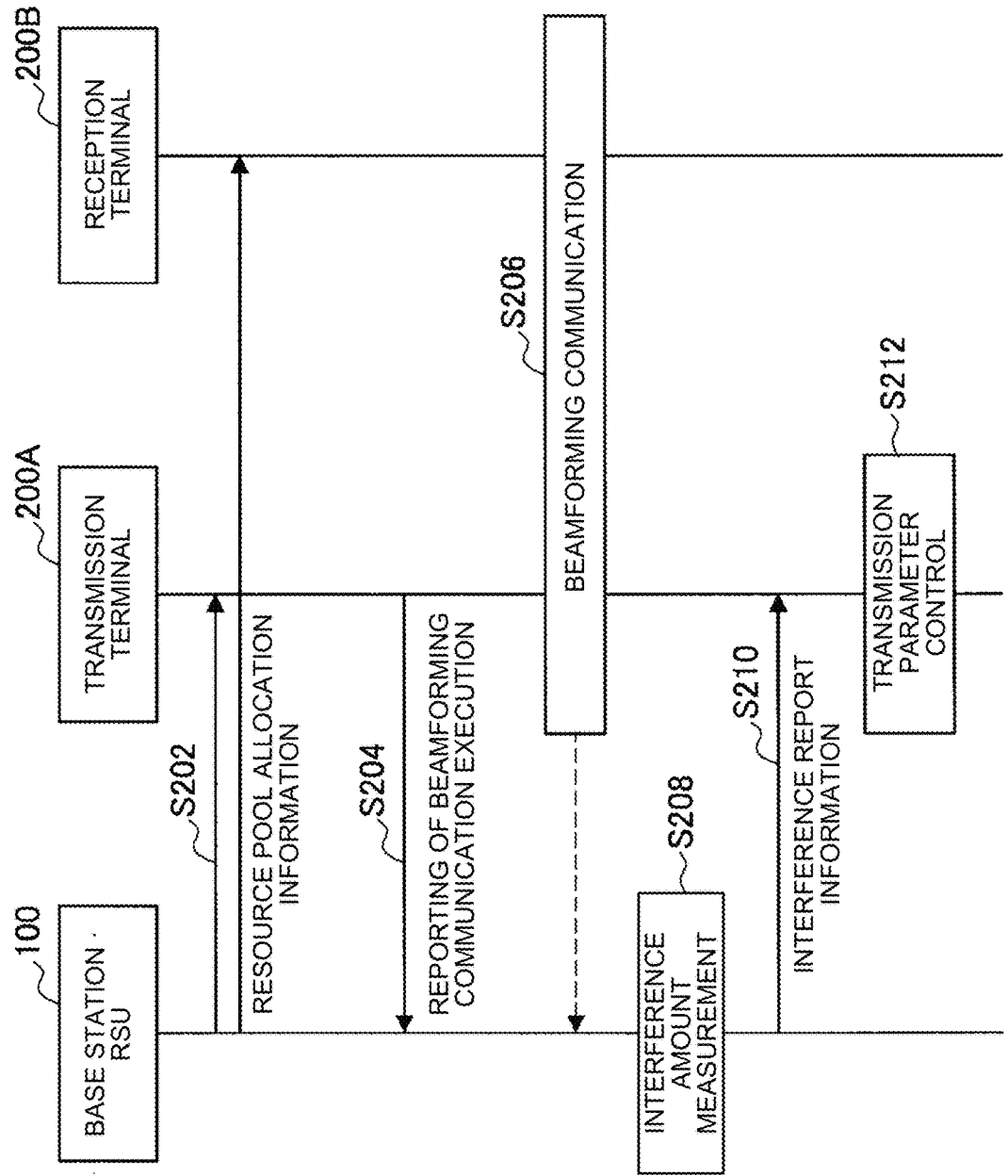
FIG. 17 is a sequence diagram illustrating an example of the flow of second interference suppression processing which is executed in the system according to the present embodiment.

An example of the flow of second interference suppression processing will be described hereinbelow with reference to FIG. 17. FIG. 17 is a sequence diagram illustrating an example of the flow of second interference suppression processing which is executed in the system 1 according to the present embodiment. As illustrated in FIG. 17, this sequence involves the base station 100, transmission terminal 200A, and reception terminal 200B. Note that the base station 100 may be a base station-type RSU.

As illustrated in FIG. 17, the base station 100 first transmits resource pool allocation information to transmission terminal 200A and reception terminal 200B (step S202). Transmission terminal 200A then reports the fact that beamforming communication is to be carried out to the base station 100 (step S204). Next, transmission terminal 200A and reception terminal 200B perform beamforming communication (step S206). More precisely, transmission terminal 200A uses a transmit beam to transmit a sidelink signal to reception terminal 200B. Meanwhile, the base station 100 measures the interference amount received due to the beamforming communication in step S206 (step S208). The base station 100 then transmits interference report information, which is generated on the basis of the measurement results, to the transmission terminal 200A (step S210). Further, transmission terminal 200A controls the transmission parameters on the basis of the interference report information which has been fed back (step S212).

<3.1.4. Third Interference Suppression Processing>

In third interference suppression processing, the transmission terminal 200 performs beam sweeping and selects a transmit beam on the basis of the feedback from the base station 100 to the beam sweeping. In this processing, the interference protection target is the base station 100.

(1) Interference Report Information for Beam Sweeping

In order to select the transmission resource used in the beamforming communication, the transmission terminal 200 uses each of a plurality of usable transmit beams to transmit a measurement signal (a reference signal, for example). Such processing is also referred to as beam sweeping. The measurement signal is transmitted in association with a beam ID. For example, the measurement signal includes information indicating the beam ID of the transmit beam or is transmitted by using the resource corresponding to the beam ID of the transmit beam. Thus, the receiving side is capable of identifying, for a received measurement signal, which transmit beam has been used to transmit the measurement signal. The measurement signals that have been subjected to beam sweeping are measured on the receiving side, and information based on the measurement results is fed back to the transmission terminal 200.

The fed back information includes information (also referred to as measurement report information hereinbelow) which is based on the measurement results, in the reception terminal 200, of the measurement signals subjected to beam sweeping by the transmission terminal 200. For example, the reception terminal 200 measures each of the measurement signals subjected to beam sweeping, generates measurement report information on the basis of the measurement results, and feeds back this information to the transmission terminal 200. For example, the reception terminal 200 feeds back, as the measurement report information, the beam IDs of the transmit beams for which an SINR of at least a predetermined threshold value has been secured.

The fed back information includes measurement results-based information (also referred to as interference report information hereinbelow) for the interference protection target (that is, the base station 100) of the measurement signals subjected to beam sweeping by the transmission terminal 200. The base station 100 measures the interference that the reception terminal 200 receives due to each of the measurement signals subjected to beam sweeping, generates interference report information on the basis of the measurement results, and feeds back this information to the transmission terminal 200. For example, the base station 100 feeds back, as interference report information, the beam IDs of transmit beams for which the interference amount exceeds a predetermined threshold value. The interference report information corresponds to the foregoing first interference-related information.

The transmission terminal 200 may also report the fact that beam sweeping is performed to the base station 100. This report may also include time-frequency resource information which is used in the beam sweeping. Thus, the base station 100 is capable of efficiently carrying out measurement of in-band emission of the reported resources and surroundings.

RRC signaling, for example, may be used for the feedback from the base station 100 to the transmission terminal 200.

(2) Selection of Transmit Beam

The transmission terminal 200 selects a transmit beam to be used for sidelink transmission to the reception terminal 200 on the basis of the measurement report information and interference report information which have been fed back. For example, the terminal device 200 selects a transmit beam, indicated by the measurement report information, for which an SINR of at least a predetermined threshold value at the reception terminal 200 has been secured and which is a transmit beam other than the transmit beams, indicated by the interference report information, for which the interference amount to the base station 100 exceeds a predetermined threshold value. Accordingly, the desired SINR at the reception terminal 200 can be secured while suppressing the interference amount to the interference protection target.

(3) Flow of Processing

Figure 18:
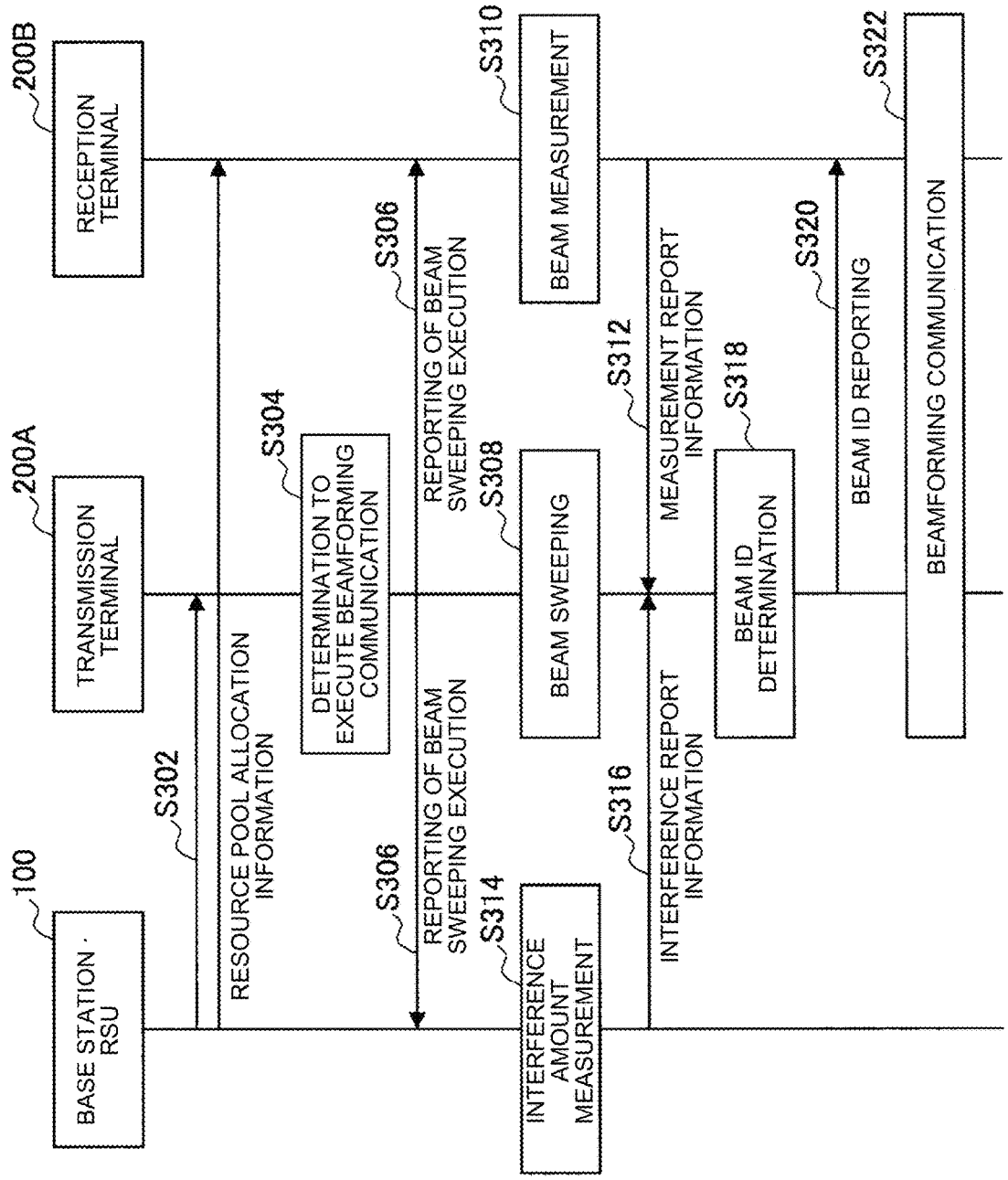
FIG. 18 is a sequence diagram illustrating an example of the flow of third interference suppression processing which is executed in the system according to the present embodiment.

An example of the flow of third interference suppression processing will be described hereinbelow with reference to FIG. 18. FIG. 18 is a sequence diagram illustrating an example of the flow of third interference suppression processing which is executed in the system 1 according to the present embodiment. As illustrated in FIG. 18, this sequence involves the base station 100, transmission terminal 200A, and reception terminal 200B. Note that the base station 100 may be a base station-type RSU.

As illustrated in FIG. 18, the base station 100 first transmits resource pool allocation information to transmission terminal 200A and reception terminal 200B (step S302). Transmission terminal 200A then determines that beamforming communication is to be performed (step S304). Next, transmission terminal 200A reports the fact that beamforming/sweeping is to be performed to the reception terminal 200B and the base station 100, respectively (step S306). At such time, information indicating the resources and timing used for beam sweeping is also reported. Next, transmission terminal 200A carries out beam sweeping (step S308).

Reception terminal 200B measures each of the measurement signals subjected to beam sweeping (step S310) and feeds back measurement report information to transmission terminal 200A (step S312). For example, reception terminal 200B feeds back the beam IDs of transmit beams for which a predetermined SINR is exceeded. Meanwhile, the base station 100 measures the interference amounts received from each of the measurement signals subjected to beam sweeping (step S314) and feeds back measurement report information to transmission terminal 200A (step S316). For example, the base station 100 feeds back the beam IDs of transmit beams for which a predetermined interference threshold value is exceeded.

Further, transmission terminal 200A determines, on the basis of the measurement report information and interference report information which have been fed back, the beam ID of the transmit beam to be used for sidelink transmission to the reception terminal 200B (step S318). Thereafter, transmission terminal 200A reports the determined beam ID to the reception terminal 200 (step S320) and uses the transmit beam of the determined beam ID to perform beamforming communication with the reception terminal 200 (step S322).

<3.2. Beamforming Taking into Account Interference to Peripheral Terminals>

<3.2.1. Technical Problem>

In sidelink communication, interference due to the effects of IBE is sometimes generated in terminal devices 200 in the vicinity of the transmission terminal 200. More precisely, when there are a plurality of pairs of a transmission terminal 200 and a reception terminal 200 that perform sidelink communication, interference due to IBE sometimes occurs between adjacent pairs even when the pairs differ in terms of the time-frequency direction of the resources used. Especially when the transmission terminal 200 performs sidelink transmission using a transmit beam, a large number of other terminal devices 200 located in the vicinity of the transmission terminal 200 may end up being subjected to interference. This point will be described with reference to FIG. 19.

Figure 19:
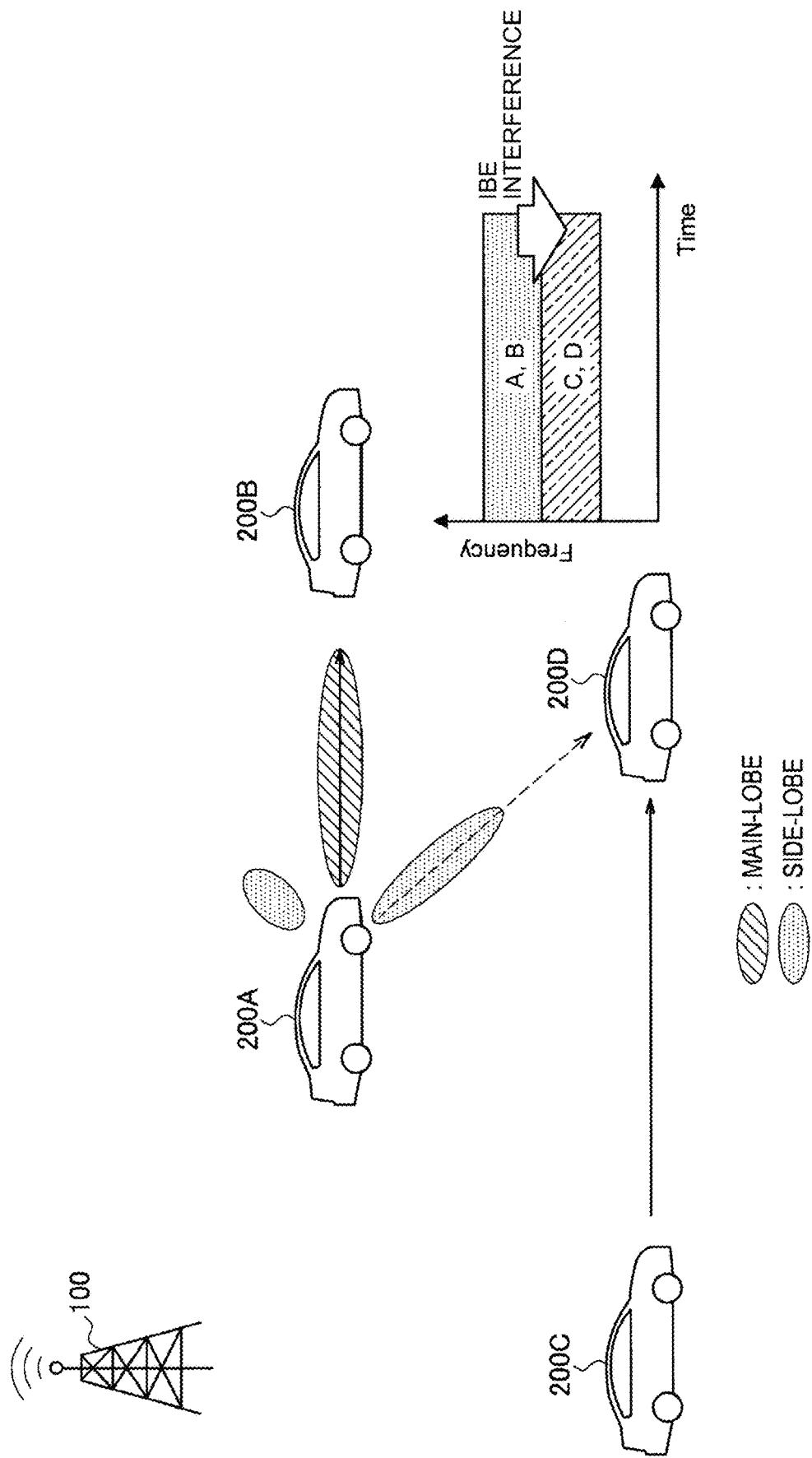
FIG. 19 is an explanatory diagram serving to illustrate an example of interference to peripheral terminal devices which is generated in sidelink communication.

FIG. 19 is an explanatory diagram serving to illustrate an example of interference to peripheral terminal devices 200 which is generated in sidelink communication. As illustrated in FIG. 19, transmission terminal 200A performs sidelink transmission using a transmit beam to reception terminal 200B, and transmission terminal 200C performs sidelink transmission to reception terminal 200D. When transmission terminal 200A has transmitted a sidelink signal by orienting the main lobe (the desired component) of the transmit beam toward reception terminal 200B, the side lobe (the interference component) of the transmit beam is then oriented toward reception terminal 200D, and unexpected interference will likely be generated. In the example illustrated in FIG. 19, even though the sidelink resources used by the transmission terminal 200A and reception terminal 200B pair and the sidelink resources used by the transmission terminal 200C and reception terminal 200D pair are orthogonal to each other in their frequency directions, interference due to IBE may arise.

A mechanism for interference suppression control that serves to suppress such interference and that takes into account the gain due to beamforming in sidelink communication is provided hereinbelow. According to the interference suppression processing described hereinbelow, even in cases where the transmission terminal 200 transmits a sidelink signal by performing beamforming, the amount of interference to peripheral terminal devices 200 can be kept at or below a predetermined amount.

<3.2.2. Fourth Interference Suppression Processing>

In fourth interference suppression processing, the transmission terminal 200 performs beam sweeping and selects a transmit beam on the basis of the feedback from peripheral terminal devices 200 to the beam sweeping. In this processing, the interference protection target is a peripheral terminal device 200 (also referred to as peripheral terminal 200 hereinbelow).

(1) Interference Report Information for Beam Sweeping

The transmission terminal 200 performs beam sweeping in which each of a plurality of usable transmit beams are used to transmit a measurement signal (a reference signal, for example). The measurement signals that have been subjected to beam sweeping are measured on the receiving side, and information based on the measurement results is fed back to the transmission terminal 200.

The fed back information includes information (also referred to as measurement report information hereinbelow) which is based on the measurement results, in the reception terminal 200, of the measurement signals subjected to beam sweeping by the transmission terminal 200. For example, the reception terminal 200 measures each of the measurement signals subjected to beam sweeping, generates measurement report information on the basis of the measurement results, and feeds back this information to the transmission terminal 200. For example, the reception terminal 200 feeds back, as the measurement report information, the beam IDs of the transmit beams for which an SINR of at least a predetermined threshold value has been secured.

The fed back information includes measurement results-based information (also referred to as interference report information hereinbelow) for the interference protection target (that is, the peripheral terminal 200) of the measurement signals subjected to beam sweeping by the transmission terminal 200. The peripheral terminal 200 measures the interference that the reception terminal 200 receives due to each of the measurement signals subjected to beam sweeping, generates interference report information on the basis of the measurement results, and feeds back this information to the transmission terminal 200. For example, the peripheral terminal 200 feeds back, as interference report information, the beam IDs of transmit beams for which the interference amount exceeds a predetermined threshold value. Feedback may be performed directly from the peripheral terminal 200 to the transmission terminal 200 or may be performed via the base station 100. The interference report information corresponds to the foregoing first interference-related information.

The transmission terminal 200 may also report (for example, broadcast), to the peripheral terminal 200, the fact that beam sweeping is to be performed. This report may also include time-frequency resource information which is used in the beam sweeping. Thus, the peripheral terminal 200 is capable of efficiently carrying out measurement of in-band emission of the reported resources and surroundings.

(2) Selection of Transmit Beam

The transmission terminal 200 selects a transmit beam to be used for sidelink transmission to the reception terminal 200 on the basis of the measurement report information and interference report information which have been fed back. For example, the terminal device 200 selects a transmit beam, indicated by the measurement report information, for which an SINR of at least a predetermined threshold value at the reception terminal 200 has been secured and which is a transmit beam other than the transmit beams, indicated by the interference report information, for which the interference amount to the peripheral terminal 200 exceeds a predetermined threshold value. Accordingly, the desired SINR at the reception terminal 200 can be secured while suppressing the interference amount to the interference protection target.

Furthermore, the transmission terminal 200 may select a transmit beam to be used for sidelink transmission to the reception terminal 200 on the basis of the interference report information from the base station 100 for the beam sweeping. The interference report information from the base station 100 is as described in third interference suppression processing. In addition, the transmission terminal 200 may configure an upper limit value for the transmit power on the basis of the interference report information from the base station 100 for the beam sweeping.

(3) Flow of Processing

Figure 20:
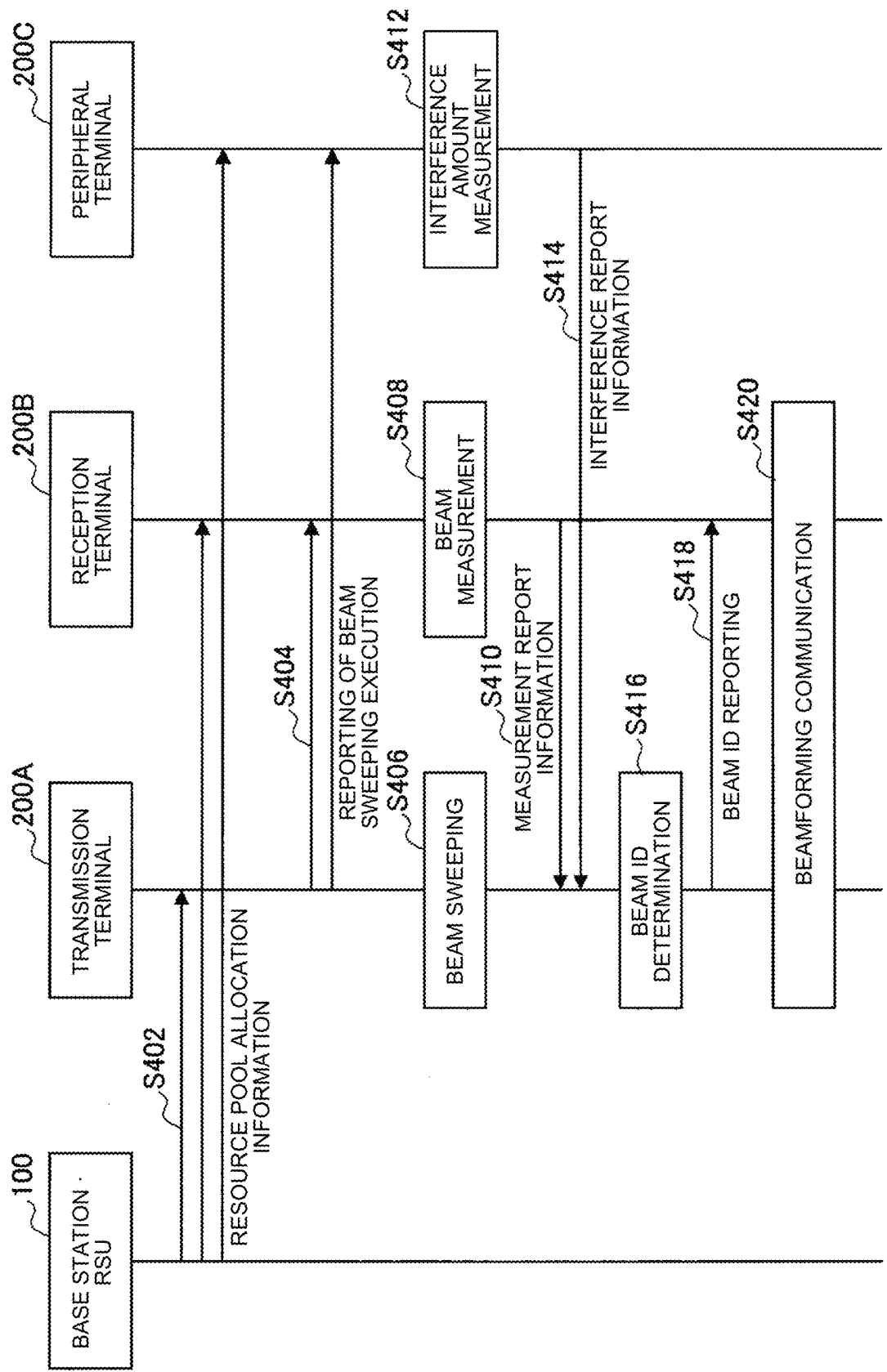
FIG. 20 is a sequence diagram illustrating an example of the flow of fourth interference suppression processing which is executed in the system according to the present embodiment.

An example of the flow of fourth interference suppression processing will be described hereinbelow with reference to FIG. 20. FIG. 20 is a sequence diagram illustrating an example of the flow of fourth interference suppression processing which is executed in the system 1 according to the present embodiment. As illustrated in FIG. 20, this sequence involves the base station 100, transmission terminal 200A, reception terminal 200B, and peripheral terminal 200C. Note that the base station 100 may be a base station-type RSU.

As illustrated in FIG. 20, the base station 100 first transmits resource pool allocation information to transmission terminal 200A, reception terminal 200B, and peripheral terminal 200C (step S402). Transmission terminal 200A then reports the fact that beam sweeping is to be carried out to each of the reception terminal 200B and peripheral terminal 200C (step S404). At such time, information indicating the resources and timing used for beam sweeping is also reported. Next, transmission terminal 200A carries out beam sweeping (step S406).

Reception terminal 200B measures each of the measurement signals subjected to beam sweeping (step S408) and feeds back measurement report information to transmission terminal 200A (step S410). For example, reception terminal 200B feeds back the beam IDs of transmit beams for which a predetermined SINR is exceeded. Meanwhile, peripheral terminal 200C measures the interference amounts received from each of the measurement signals subjected to beam sweeping (step S412) and feeds back interference report information to transmission terminal 200A (step S414). For example, peripheral terminal 200C feeds back the beam IDs of transmit beams for which a predetermined interference threshold value is exceeded.

Further, transmission terminal 200A determines, on the basis of the measurement report information and interference report information which have been fed back, the beam ID of the transmit beam to be used for sidelink transmission to the reception terminal 200B (step S416). Thereafter, transmission terminal 200A reports the determined beam ID to the reception terminal 200 (step S418) and uses the transmit beam of the determined beam ID to perform beamforming communication with the reception terminal 200 (step S420).

<3.2.3. Fifth Interference Suppression Processing>

In fifth interference suppression processing, the interference protection target feeds back the effects of beamforming communication between the transmission terminal 200 and the reception terminal 200, to the transmission terminal 200, and the transmission terminal 200 controls the transmission parameters on the basis of the feedback. In this processing, the interference protection target is a peripheral terminal 200.

(1) Interference Report Information for Sidelink Communication Using a Transmit Beam The peripheral terminal 200 measures IBE interference due to a sidelink transmission using a transmit beam by the transmission terminal 200. Further, the peripheral terminal 200 feeds back measurement results-based information (also referred to as interference report information hereinbelow) to the transmission terminal 200. The peripheral terminal 200 may also be triggered to provide feedback when the interference amount exceeds a predetermined threshold value.

The interference report information corresponds to the foregoing first interference-related information. The interference report information is measurement results-based information for the interference protection target (that is, the peripheral terminal 200) about the interference due to sidelink communication using a transmit beam that has been performed between the transmission terminal 200 and reception terminal 200. For example, the interference report information includes at least one of the information indicated below:

Information indicating that a predetermined interference amount has been exceeded Information for transmit power control Request to modify transmit beam used Request to stop beamforming Request to modify resources used Information for transmit power control includes information for requesting a reduction in transmit power, for example. A request to modify the resources used includes information requesting modification of the resources used in the allocated resource pool.

The peripheral terminal 200 generates the foregoing information by measuring interference due to a sidelink transmission using a transmit beam by the transmission terminal 200. This information may be associated with the beam ID of the measured transmit beam.

Interference report information may further include at least one of the information indicated below:

Time-frequency resources used by peripheral terminal 200
IBE interference measurement results
Position information of peripheral terminal 200
Direction of travel of peripheral terminal 200
Position information of transmission terminal 200
Direction of travel of transmission terminal 200

Note that IBE interference measurement results may include information indicating the interference amount or may include information indicating the amount by which the interference amount exceeds the threshold value.

(2) Feedback Method

The peripheral terminal 200 may feed back interference report information directly to the transmission terminal 200. The peripheral terminal 200 may broadcast interference report information to its surroundings or may unicast same to the transmission terminal 200. Sidelink control information (SCI) or sidelink shared channel (SSCH) may be used for feedback.

The peripheral terminal 200 may feed back interference report information via the base station 100. In this case, the peripheral terminal 200 reports to the base station 100, along with the interference report information, information identifying the transmission terminal 200 constituting the source of interference, information indicating resources for which interference has occurred, and the beam ID of the transmit beam which is subject to interference. The specification by the base station 100 of the feedback destination and the feedback method are as per the second interference suppression processing.

(3) Control of Transmission Parameters

The transmission terminal 200 controls the transmission parameters on the basis of the interference report information which has been fed back from the peripheral terminal 200. The transmission terminal 200 controls the transmission parameters so that the interference amount to the peripheral terminal 200 is no more than a predetermined threshold value. The interference to the peripheral terminal 200 can accordingly be suppressed. For example, the transmission terminal 200 establishes transmission parameters relating to at least one of the following:

Transmit power control
Stoppage of beamforming
Modification of transmit beam used
Modification of resources used
Modification of resource pool used For transmit power control, the transmission terminal 200 makes the determination to lower the transmit power. For modification of the transmit beam used, the transmission terminal 200 determines the transmit beam to be modified on the basis of the position information of the transmission terminal 200, the reception terminal 200, and the peripheral terminal 200. For modification of the resources used and modification of the resource pool used, the transmission terminal 200 performs processing to modify the resources used or the resource pool used so that there is a long distance in the frequency direction from the resources used by the peripheral terminal 200.

When the transmission parameters are specifically instructed in the interference report information, the transmission terminal 200 determines (that is, applies as is) the transmission parameters in accordance with the instruction.

The transmission terminal 200 may store the interference report information in a database. Further, the terminal device 200 may control the transmission parameters (select the transmit beam, for example) on the basis of the positional relationship between the transmission terminal 200 and the peripheral terminal 200, and the stored interference report information.

(4) Flow of Processing

Figure 21:
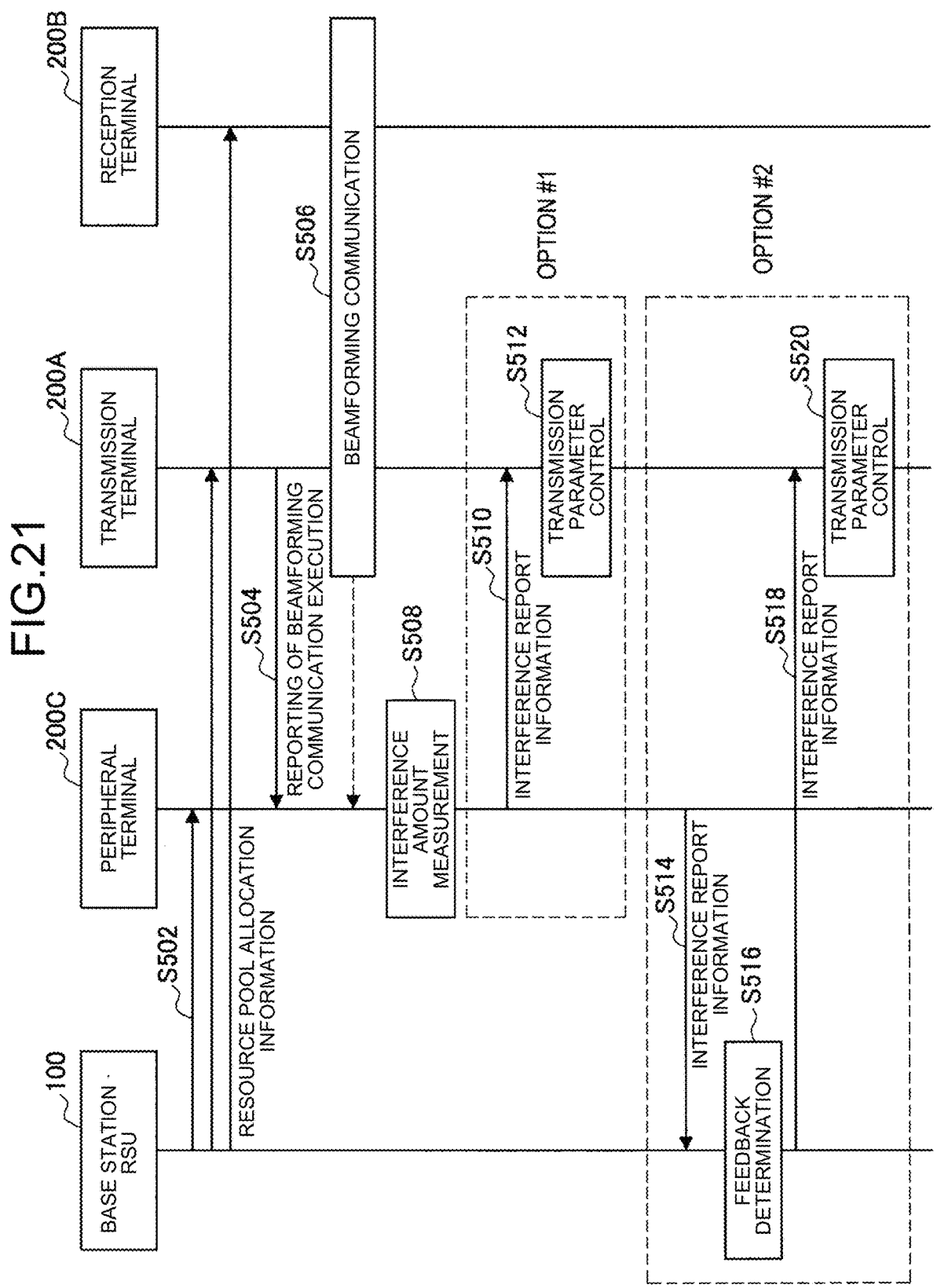
FIG. 21 is a sequence diagram illustrating an example of the flow of fifth interference suppression processing which is executed in the system according to the present embodiment.

An example of the flow of fifth interference suppression processing will be described hereinbelow with reference to FIG. 21. FIG. 21 is a sequence diagram illustrating an example of the flow of fifth interference suppression processing which is executed in the system 1 according to the present embodiment. As illustrated in FIG. 21, this sequence involves the base station 100, transmission terminal 200A, reception terminal 200B, and peripheral terminal 200C. Note that the base station 100 may be a base station-type RSU.

As illustrated in FIG. 21, the base station 100 first transmits resource pool allocation information to transmission terminal 200A, reception terminal 200B, and peripheral terminal 200C (step S502). Transmission terminal 200A then reports the fact that beamforming communication is to be carried out to peripheral terminal 200C (step S504). Next, transmission terminal 200A and reception terminal 200B perform beamforming communication (step S506). More precisely, transmission terminal 200A uses a transmit beam to transmit a sidelink signal to reception terminal 200B. Meanwhile, peripheral terminal 200C measures the interference amount received due to the beamforming communication in step S506 (step S508). Thereafter, either option #1 or #2 is performed.

For option #1, peripheral terminal 200C transmits interference report information, which is generated on the basis of the measurement results, to transmission terminal 200A (step S510). Further, transmission terminal 200A controls the transmission parameters on the basis of the interference report information which has been fed back (step S512).

For option #2, peripheral terminal 200C transmits measurement results-based information to the base station 100 (step S514). Next, the base station 100 specifies, for the interference report information acquired from peripheral terminal 200C, the feedback destination and determines the feedback method (step S516). The base station 100 then transmits the interference report information acquired from peripheral terminal 200C to transmission terminal 200A (step S518). Further, transmission terminal 200A controls the transmission parameters on the basis of the interference report information which has been fed back (step S520).

<3.2.4. Sixth Interference Suppression Processing>

Among the peripheral terminals 200, the peripheral terminal 200 on the transmitting side is also called the peripheral transmission terminal 200, and the peripheral terminal 200 on the receiving side is also called the peripheral reception terminal 200. In sixth interference suppression processing, the peripheral transmission terminal 200 controls the transmission parameters used for sidelink transmission on the basis of the effect on the peripheral reception terminal 200 due to sidelink transmission using a transmit beam from the transmission terminal 200 to the reception terminal 200. In this processing, the interference protection target is the peripheral reception terminal 200, and the source of interference is the transmission terminal 200.

(1) Interference Report Information for Sidelink Communication Using a Transmit Beam The peripheral reception terminal 200 measures IBE interference due to a sidelink transmission using a transmit beam by the transmission terminal 200. Further, the peripheral terminal 200 feeds back measurement results-based information (also referred to as interference report information hereinbelow) to the peripheral transmission terminal 200. The peripheral reception terminal 200 may also be triggered to provide feedback when the interference amount exceeds a predetermined threshold value.

The interference report information corresponds to the foregoing second interference-related information. The interference report information is measurement results-based information for the interference protection target (that is, the peripheral reception terminal 200) about the interference due to sidelink communication using a transmit beam that has been performed with another terminal device 200 (that is, between the transmission terminal 200 and reception terminal 200). For example, the interference report information includes at least one of the information indicated below:

Information indicating that a predetermined interference amount has been exceeded
Information for transmit power control
Request to modify transmit beam used
Request to modify resources used Information for transmit power control includes information for requesting an increase in transmit power, for example. A request to modify the resources used includes information requesting modification of the resources used in the allocated resource pool.

The peripheral reception terminal 200 generates the foregoing information by measuring interference due to a sidelink transmission using a transmit beam by the transmission terminal 200. This information may be associated with the beam ID of the measured transmit beam.

Interference report information may further include at least one of the information indicated below:

Time-frequency resources for which interference has occurred
IBE interference measurement results
Position information of peripheral reception terminal 200 and transmission terminal 200
Direction of travel of peripheral reception terminal 200 and transmission terminal 200

Note that IBE interference measurement results may include information indicating the interference amount or may include information indicating the amount by which the interference amount exceeds the threshold value.

(2) Feedback Method

The feedback method is as per fifth interference suppression processing.

(3) Control of Transmission Parameters

The peripheral transmission terminal 200 controls the transmission parameters on the basis of the interference report information which has been fed back from the peripheral reception terminal 200. The peripheral transmission terminal 200 controls the transmission parameters to improve the SINR at the peripheral reception terminal 200. Accordingly, the relative effect, in comparison with the desired component, of the interference received by the peripheral reception terminal 200 can be suppressed. For example, the peripheral transmission terminal 200 performs at least one of the following:

Transmit power control
Beamforming execution
Modification of transmit beam used
Modification of resources used
Modification of resource pool used For transmit power control, the peripheral transmission terminal 200 makes the determination to raise the transmit power. For modification of the transmit beam used, the peripheral transmission terminal 200 determines the transmit beam to be modified on the basis of the position information of the transmission terminal 200, the reception terminal 200, and the peripheral reception terminal 200. For modification of the resources used and modification of the resource pool used, the peripheral transmission terminal 200 performs processing to modify the resources used or the resource pool used so that there is a long distance in the frequency direction from the resources used by the transmission terminal 200.

When the transmission parameters are indicated in specific terms in the interference report information, the peripheral transmission terminal 200 determines (that is, applies as is) the transmission parameters in accordance with the indications.

(4) Flow of Processing

Figure 22:
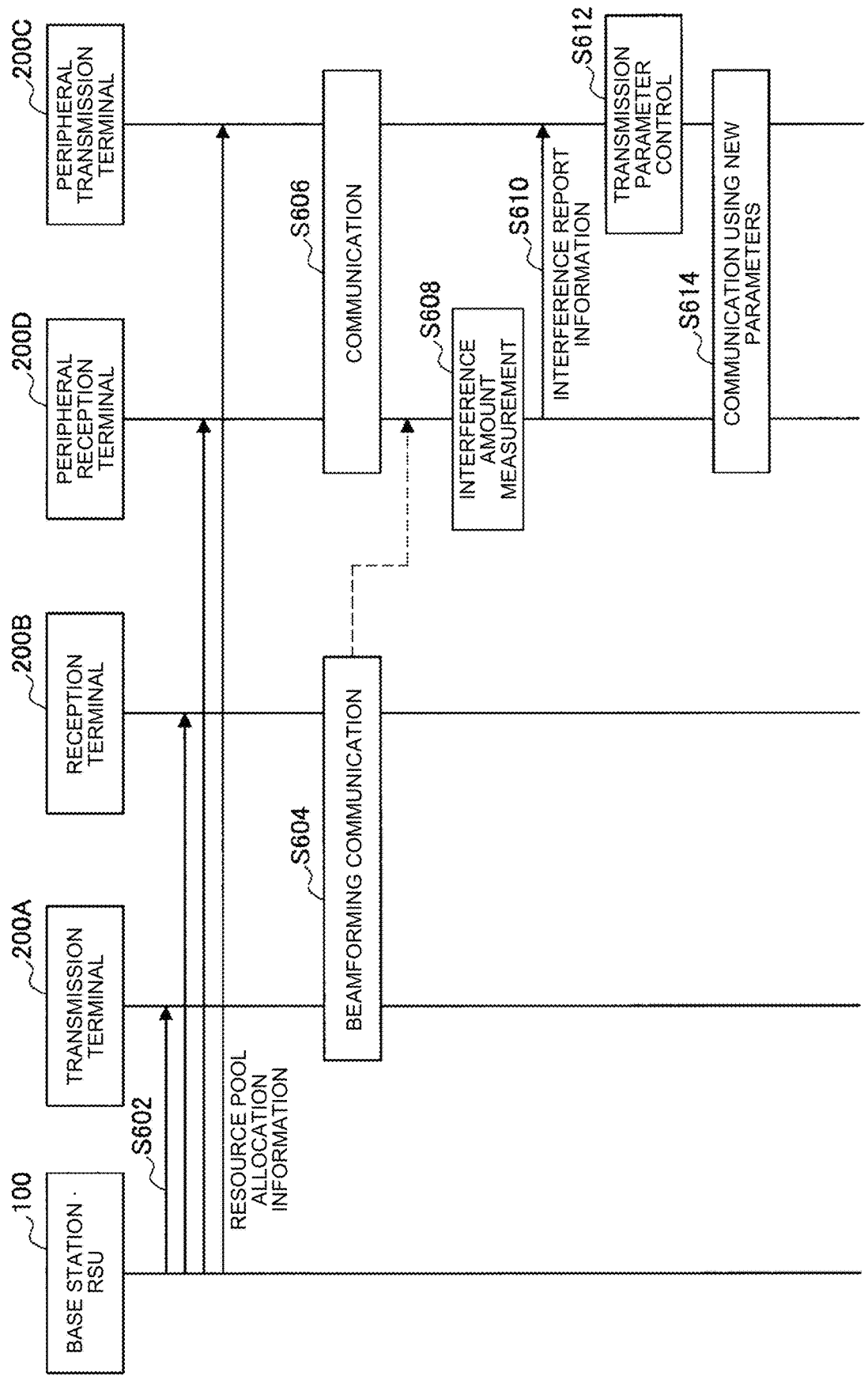
FIG. 22 is a sequence diagram illustrating an example of the flow of sixth interference suppression processing which is executed in the system according to the present embodiment.

An example of the flow of sixth interference suppression processing will be described hereinbelow with reference to FIG. 22. FIG. 22 is a sequence diagram illustrating an example of the flow of sixth interference suppression processing which is executed in the system 1 according to the present embodiment. As illustrated in FIG. 22, this sequence involves the base station 100, transmission terminal 200A, reception terminal 200B, peripheral transmission terminal 200C, and peripheral reception terminal 200D. Note that the base station 100 may be a base station-type RSU.

As illustrated in FIG. 22, the base station 100 first transmits resource pool allocation information to transmission terminal 200A, reception terminal 200B, peripheral transmission terminal 200C, and peripheral reception terminal 200D (step S602). Next, the transmission terminal 200 and reception terminal 200 perform beamforming communication (step S604), and peripheral transmission terminal 200C and peripheral reception terminal 200D perform communication (may be beamforming communication) (step S606). Next, the peripheral reception terminal 200D measures the interference amount received due to the beamforming communication in step S604 (step S608). Peripheral reception terminal 200D then transmits interference report information, which is generated on the basis of the measurement results, to peripheral transmission terminal 200C (step S610). Further, peripheral transmission terminal 200C controls the transmission parameters for improving the SINR on the basis of the interference report information which has been fed back (step S612) and uses the new transmission parameters to communicate with peripheral reception terminal 200D (step S614).

4. Application Examples

The technology according to the present disclosure can be applied to various products.

For example, the base station 100 may be realized as any type of evolved Node B (eNB) such as a macro eNB or a small eNB. The small eNB may be an eNB that covers a cell smaller than a macrocell, such as a pico eNB, a micro eNB, or a home (femto) eNB. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals, described subsequently, may operate as the base station 100 by performing base station functions temporarily or semi-permanently.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Furthermore, the terminal device 200 may be realized as a terminal (also referred to as a machine type communication (MTC) terminal) that performs machine to machine (M2M) communication. Furthermore, the terminal device 200 may be a wireless communication module (an integrated circuit module configured from one die, for example) that is mounted on these terminals.

4.1. Application Examples for Base Station

First Application Example

Figure 23:
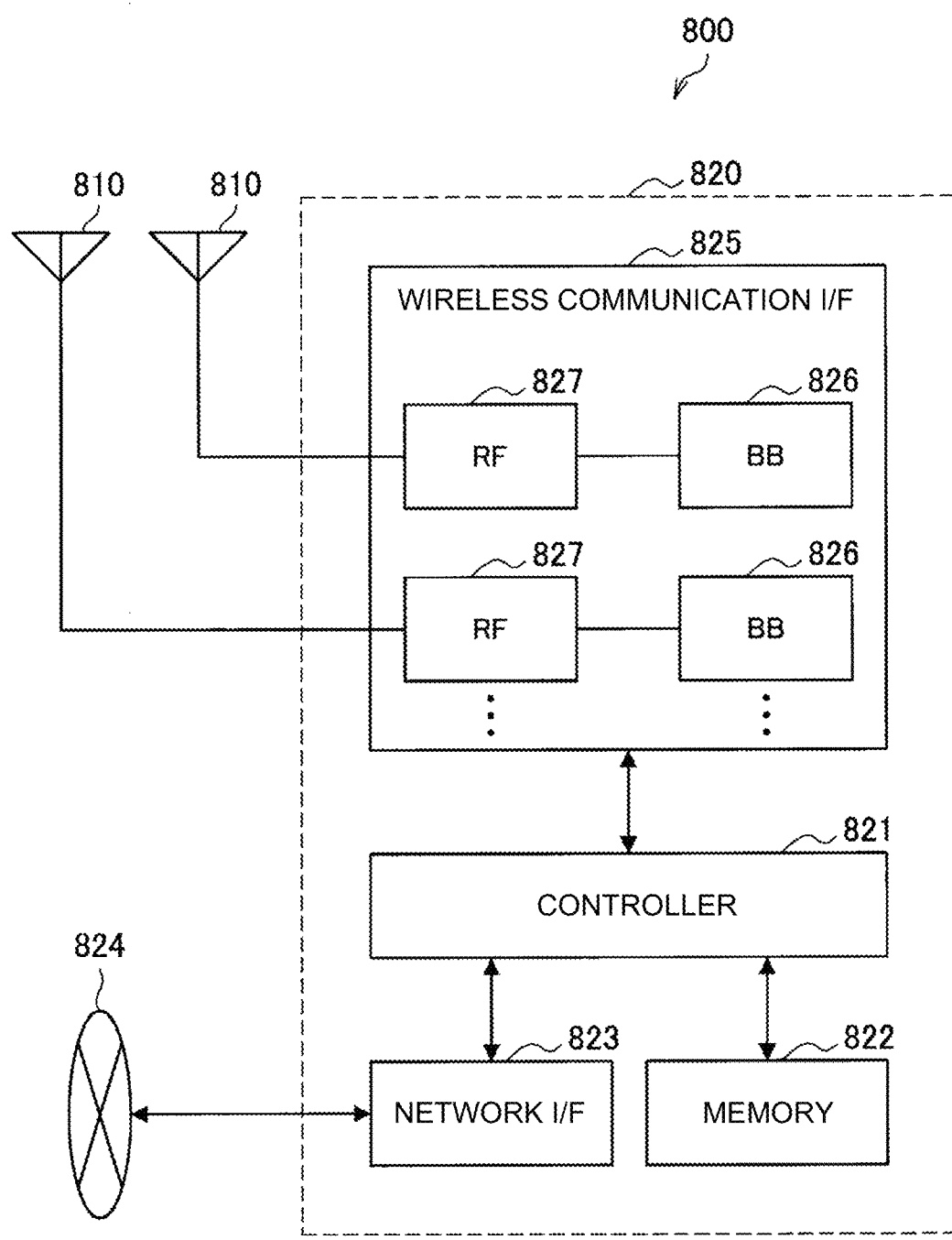
FIG. 23 is a block diagram illustrating a first example of an approximate configuration of an evolved NodeB (eNB).

FIG. 23 is a block diagram illustrating a first example of an approximate configuration of an eNB to which the technology according to the present disclosure may be applied. An eNB 800 includes one or more antennas 810 and a base station device 820. Each antenna 810 and base station device 820 may be interconnected via an RF cable.

Each of the antennas 810 includes a single or a plurality of antenna elements (for example, a plurality of antenna elements constituting a MIMO antenna) and is used by the base station device 820 to transmit and receive a wireless signal. The eNB 800 includes a plurality of antennas 810 as illustrated in FIG. 23, and the plurality of antennas 810 may correspond, respectively, to a plurality of frequency bands used by the eNB 800, for example. Note that, although FIG. 23 illustrates an example in which the eNB 800 includes a plurality of antennas 810, the eNB 800 may also include a single antenna 810.

The base station device 820 includes a controller 821, a memory 822, a network interface 823, and a wireless communications interface 825.

The controller 821 may be, for example, a CPU or a DSP, and operates various functions of an upper layer of the base station device 820. For example, the controller 821 generates a data packet from data in a signal processed by the wireless communications interface 825, and transfers the generated packet via the network interface 823. The controller 821 may generate a bundled packet by bundling data from a plurality of baseband processors and transfer the generated bundled packet. Further, the controller 821 may also have a logical function of performing control such as radio resource control, radio bearer control, mobility management, admission control, or scheduling. Further, the control may be performed in cooperation with a peripheral eNB or a core network node. The memory 822 includes a RAM and a ROM, and stores a program executed by the controller 821 and a variety of control data (such as, for example, a terminal list, transmit power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (for example, an S1 interface or X2 interface). The network interface 823 may be a wired communication interface or a wireless communications interface for wireless backhaul. In the case where the network interface 823 is a wireless communications interface, the network interface 823 may use a frequency band for wireless communication which is higher than a frequency band used by the wireless communications interface 825.

The wireless communications interface 825 supports some kind of cellular communication system such as long term evolution (LTE) or LTE-Advanced, and provides wireless connection to a terminal located within the cell of the eNB 800 via the antenna 810. The wireless communications interface 825 may typically include a baseband (BB) processor 826, an RF circuit 827, and the like. The BB processor 826 may, for example, perform encoding/decoding, modulation/demodulation, multiplexing/demultiplexing, and the like, and performs a variety of signal processing on each layer (for example, L1, medium access control (MAC), radio link control (RLC), and packet data convergence protocol (PDCP)). The BB processor 826 may have some or all of the foregoing logical functions instead of the controller 821. The BB processor 826 may be a module that includes a memory having a communications control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communications interface 825 includes a plurality of BB processors 826 as illustrated in FIG. 23, and the plurality of BB processors 826 may correspond, respectively, to a plurality of frequency bands used by the eNB 800, for example. Furthermore, the wireless communications interface 825 may include a plurality of RF circuits 827 as illustrated in FIG. 23, and the plurality of RF circuits 827 may correspond, respectively, to a plurality of antenna elements, for example. Note that, although FIG. 23 illustrates an example in which the wireless communications interface 825 includes a plurality of BB processors 826 and a plurality of RF circuits 827, the wireless communications interface 825 may include a single BB processor 826 or a single RF circuit 827.

In the eNB 800 illustrated in FIG. 23, one or more constituent elements (the measurement reporting unit 151 and/or the communications control unit 152) included in the control unit 150 described with reference to FIG. 11 may also be mounted in the wireless communications interface 825. Alternatively, at least some of the constituent elements may be mounted in the controller 821. As one example, the eNB 800 may incorporate a module that includes part (for example, the BB processor 826) or all of the wireless communications interface 825 and/or the controller 821. One or more of the foregoing constituent elements may also be mounted in the module. In this case, the module may store a program for causing a processor to function as the one or more constituent elements (in other words, a program for causing the processor to execute operations of the one or more constituent elements) and execute the program. As another example, a program for causing the processor to function as the one or more constituent elements may be installed in the eNB 800, and the wireless communications interface 825 (for example, the BB processor 826) and/or the controller 821 may execute the program. In this way, the eNB 800, the base station device 820, or the module may be provided as a device including the one or more constituent elements, and a program for causing the processor to function as the one or more constituent elements may be provided. In addition, a readable recording medium on which the program is recorded may be provided.

Furthermore, in the eNB 800 illustrated in FIG. 23, the wireless communications unit 120 described with reference to FIG. 11 may also be mounted in the wireless communications interface 825 (for example, the RF circuit 827). Further, the antenna unit 110 may be mounted in the antenna 810. In addition, the network communications unit 130 may be mounted in the controller 821 and/or the network interface 823. Further, the storage unit 140 may be mounted in the memory 822.

Second Application Example

FIG. 24 is a block diagram illustrating a second example of an approximate configuration of an eNB to which the technology according to the present disclosure may be applied. An eNB 830 includes one or more antennas 840, a base station device 850, and an RRH 860. Each of the antennas 840 and the RRH 860 may be interconnected via an RF cable. Further, the base station device 850 and the RRH 860 may be interconnected by a high speed line such as optical fiber cables.

Each of the antennas 840 includes a single or a plurality of antenna elements (for example, a plurality of antenna elements constituting a MIMO antenna) and is used for the RRH 860 to transmit and receive a wireless signal. The eNB 830 includes a plurality of antennas 840 as illustrated in FIG. 24, and the plurality of antennas 840 may correspond, respectively, to a plurality of frequency bands used by the eNB 830, for example. Note that, although FIG. 24 illustrates an example in which the eNB 830 includes a plurality of antennas 840, the eNB 830 may also include a single antenna 840.

The base station device 850 includes a controller 851, a memory 852, a network interface 853, a wireless communications interface 855, and a connection interface 857. The controller 851, memory 852, and network interface 853 are the same as the controller 821, memory 822, and network interface 823 described with reference to FIG. 23.

The wireless communications interface 855 supports some kind of cellular communication system such as LTE or LTE-Advanced and provides wireless connection to a terminal located in a sector corresponding to the RRH 860 via the RRH 860 and the antenna 840. The wireless communications interface 855 may typically include a BB processor 856 or the like. The BB processor 856 is the same as the BB processor 826 described with reference to FIG. 23 except for being connected to the RF circuit 864 of the RRH 860 via the connection interface 857. The wireless communications interface 855 includes a plurality of BB processors 856 as illustrated in FIG. 24, and the plurality of BB processors 856 may correspond, respectively, to a plurality of frequency bands used by the eNB 830, for example. Note that, although FIG. 24 illustrates an example in which the wireless communications interface 855 includes a plurality of BB processors 856, the wireless communications interface 855 may include a single BB processor 856.

The connection interface 857 is an interface for connecting the base station device 850 (wireless communications interface 855) to the RRH 860. The connection interface 857 may be a communication module for communication on the high speed line which connects the base station device 850 (wireless communications interface 855) to the RRH 860.

Further, the RRH 860 includes a connection interface 861 and a wireless communications interface 863.

The connection interface 861 is an interface for connecting the RRH 860 (wireless communications interface 863) to the base station device 850. The connection interface 861 may be a communication module for communication on the high speed line.

The wireless communications interface 863 transmits and receives a wireless signal via the antenna 840. The wireless communications interface 863 may typically include the RF circuit 864 or the like. The RF circuit 864 may include a mixer, a filter, an amplifier, and the like, and transmits and receives a wireless signal via the antenna 840. The wireless communications interface 863 may include a plurality of RF circuits 864 as illustrated in FIG. 24, and the plurality of RF circuits 864 may correspond, respectively, to a plurality of antenna elements, for example. Note that, although FIG. 24 illustrates an example in which the wireless communications interface 863 includes a plurality of RF circuits 864, the wireless communications interface 863 may include a single RF circuit 864, for example.

In the eNB 830 illustrated in FIG. 24, one or more constituent elements (the measurement reporting unit 151 and/or the communications control unit 152) included in the control unit 150 described with reference to FIG. Y may also be mounted in the wireless communications interface 855 and/or the wireless communications interface 863. Alternatively, at least some of the constituent elements may be mounted in the controller 851. As one example, the eNB 830 may incorporate a module that includes part (for example, the BB processor 856) or all of the wireless communications interface 855 and/or the controller 851. One or more of the foregoing constituent elements may also be mounted in the module. In this case, the module may store a program for causing a processor to function as the one or more constituent elements (in other words, a program for causing the processor to execute operations of the one or more constituent elements) and execute the program. As another example, a program for causing the processor to function as the one or more constituent elements may be installed in the eNB 830, and the wireless communications interface 855 (for example, the BB processor 856) and/or the controller 851 may execute the program. In this way, the eNB 830, the base station device 850, or the module may be provided as a device including the one or more constituent elements, and a program for causing the processor to function as the one or more constituent elements may be provided. In addition, a readable recording medium on which the program is recorded may be provided.

Furthermore, in the eNB 830 illustrated in FIG. 24, the wireless communications unit 120 described with reference to FIG. 11, for example, may also be mounted in the wireless communications interface 863 (for example, the RF circuit 864). Further, the antenna unit 110 may be mounted in the antenna 840. In addition, the network communications unit 130 may be mounted in the controller 851 and/or the network interface 853. Further, the storage unit 140 may be mounted in the memory 852.

4.2. Terminal Device-Related Application Examples

First Application Example

FIG. 25 is a block diagram illustrating an example of an approximate configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a loudspeaker 911, a wireless communications interface 912, one or more antenna switches 915, one or more antennas 916, a bus 917, a battery 918, and an auxiliary controller 919.

The processor 901 may be, for example, a CPU or a system on chip (SoC) and controls the functions of an application layer and other layers of the smartphone 900. The memory 902 includes a RAM and a ROM, and stores a program executed by the processor 901 and data. The storage 903 may include a storage medium such as a semiconductor memory or a hard disk. The external connection interface 904 is an interface for connecting the smartphone 900 to externally attached devices such as memory cards or universal serial bus (USB) devices.

The camera 906 includes, for example, an imaging element such as a charge coupled device (CCD) or a complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is input to the smartphone 900 to an audio signal. The input device 909 includes, for example, a touch sensor which detects touching of a screen of the display device 910, a keypad, a keyboard, a button, a switch, or the like, and accepts an operation or an information input from a user. The display device 910 includes a screen such as a liquid crystal display (LCD) or an organic light emitting diode (OLED) display and displays an output image of the smartphone 900. The loudspeaker 911 converts the audio signal that is output from the smartphone 900 to audio.

The wireless communications interface 912 supports some kind of cellular communication system such as LTE or LTE-Advanced and performs wireless communication. The wireless communications interface 912 may typically include a BB processor 913 and an RF circuit 914, and the like. The BB processor 913 may, for example, perform encoding/decoding, modulation/demodulation, multiplexing/demultiplexing, and the like, and executes a variety of types of signal processing for wireless communication. On the other hand, the RF circuit 914 may include a mixer, a filter, an amplifier, and the like, and transmits and receives a wireless signal via the antenna 916. The wireless communications interface 912 may be a one-chip module in which the BB processor 913 and the RF circuit 914 are integrated. The wireless communications interface 912 may include a plurality of BB processors 913 and a plurality of RF circuits 914, as illustrated in FIG. 25. Note that, although FIG. 25 illustrates an example in which the wireless communications interface 912 includes a plurality of BB processors 913 and a plurality of RF circuits 914, the wireless communications interface 912 may include a single BB processor 913 or a single RF circuit 914.

Further, the wireless communications interface 912 may support other types of wireless communication system such as a short range wireless communication system, a near field communication system, or a wireless local area network (LAN) system in addition to the cellular communication system, and in this case, the wireless communications interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communications interface 912.

Each of the antennas 916 includes one or more antenna elements (for example, a plurality of antenna elements constituting a MIMO antenna) and is used for transmission and reception of a wireless signal by the wireless communications interface 912. The smartphone 900 may include a plurality of antennas 916 as illustrated in FIG. 25. Note that, although FIG. 25 illustrates an example in which the smartphone 900 includes a plurality of antennas 916, the smartphone 900 may also include a single antenna 916.

Further, the smartphone 900 may include the antenna 916 for each wireless communication system. In this case, the antenna switch 915 may be omitted from a configuration of the smartphone 900.

The bus 917 interconnects the processor 901, the memory 902, the storage 903, the external connection interface 904, the camera 906, the sensor 907, the microphone 908, the input device 909, the display device 910, the loudspeaker 911, the wireless communications interface 912, and the auxiliary controller 919. The battery 918 supplies power to each block of the smartphone 900 illustrated in FIG. 25 via a supply line which is partially illustrated in the drawing using broken lines. The auxiliary controller 919 operates minimally necessary functions of the smartphone 900 in a sleep mode, for example.

In the smartphone 900 illustrated in FIG. 25, one or more constituent elements (the acquisition unit 241, the parameter determination unit 242, the transmission processing unit 243 and/or the measurement reporting unit 243) which are included in the control unit 240 described with reference to FIG. 12 may also be mounted in the wireless communications interface 912. Alternatively, at least some of these constituent elements may be mounted in the processor 901 or the auxiliary controller 919. As one example, the smartphone 900 may incorporate a module that includes part (for example, the BB processor 913) or all of the wireless communications interface 912, the processor 901 and/or the auxiliary controller 919. One or more of the foregoing constituent elements may also be mounted in the module. In this case, the module may store a program for causing a processor to function as the one or more constituent elements (in other words, a program for causing the processor to execute operations of the one or more constituent elements) and execute the program. As another example, a program for causing the processor to function as the one or more constituent elements may be installed in the smartphone 900, and the wireless communications interface 912 (for example, the BB processor 913), the processor 901, and/or the auxiliary controller 919 may execute the program. In this way, the smartphone 900 or the module may be provided as a device including the one or more constituent elements, and a program for causing the processor to function as the one or more constituent elements may be provided. In addition, a readable recording medium on which the program is recorded may be provided.

Furthermore, in the smartphone 900 illustrated in FIG. 25, the wireless communications unit 220 described with reference to FIG. 12, for example, may also be mounted in the wireless communications interface 912 (for example, the RF circuit 914). Further, the antenna unit 210 may be mounted in the antenna 916. Further, the storage unit 230 may be mounted in the memory 902.

Second Application Example

FIG. 26 is a block diagram illustrating an example of an approximate configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a loudspeaker 931, a wireless communications interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (for example, latitude, longitude, and altitude) of the car navigation apparatus 920. The sensor 925 may include a sensor group including, for example, a gyro sensor, a geomagnetic sensor, a barometric sensor, and the like. The data interface 926 is, for example, connected to an in-vehicle network 941 via a terminal that is not illustrated, and acquires data generated on the vehicle side such as vehicle speed data.

The content player 927 plays back content stored in a storage medium (for example, a CD or DVD) inserted into the storage medium interface 928. The input device 929 includes, for example, a touch sensor which detects touching of a screen of the display device 930, a button, or a switch, or the like, and accepts operation or information input from a user. The display device 930 includes a screen such as an LCD or OLED display and displays images of navigation functions or played back content. The loudspeaker 931 outputs audio of the navigation functions or played back content.

The wireless communications interface 933 supports some kind of cellular communication system such as LTE or LTE-Advanced and performs wireless communication. The wireless communications interface 933 may typically include the BB processor 934, the RF circuit 935, and the like. The BB processor 934 may, for example, perform encoding/decoding, modulation/demodulation, multiplexing/demultiplexing, and the like, and executes a variety of types of signal processing for wireless communication. On the other hand, the RF circuit 935 may include a mixer, a filter, an amplifier, and the like, and transmits and receives a wireless signal via the antenna 937. The wireless communications interface 933 may be a one-chip module in which the BB processor 934 and the RF circuit 935 are integrated. The wireless communications interface 933 may include a plurality of BB processors 934 and a plurality of RF circuits 935, as illustrated in FIG. 26. Note that, although FIG. 26 illustrates an example in which the wireless communications interface 933 includes a plurality of BB processors 934 and a plurality of RF circuits 935, the wireless communications interface 933 may include a single BB processor 934 or a single RF circuit 935.

Further, the wireless communications interface 933 may support other types of wireless communication system such as a short range wireless communication system, a near field communication system, or a wireless LAN system in addition to the cellular communication system, and in this case, the wireless communications interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communications interface 933.

Each of the antennas 937 includes one or more antenna elements (for example, a plurality of antenna elements constituting a MIMO antenna) and is used for transmission and reception of a wireless signal by the wireless communications interface 933. The car navigation apparatus 920 may include a plurality of antennas 937 as illustrated in FIG. 26. Note that, although FIG. 26 illustrates an example in which the car navigation apparatus 920 includes a plurality of antennas 937, the car navigation apparatus 920 may also include a single antenna 937.

Further, the car navigation apparatus 920 may include the antenna 937 for each wireless communication system. In this case, the antenna switch 936 may be omitted from a configuration of the car navigation apparatus 920.

The battery 938 supplies power to each block of the car navigation apparatus 920 illustrated in FIG. 26 via a supply line which is partially illustrated in the drawing using broken lines. Further, the battery 938 stores the electric power supplied from the vehicle side.

In the car navigation apparatus 920 illustrated in FIG. 26, one or more constituent elements (the acquisition unit 241, the parameter determination unit 242, the transmission processing unit 243 and/or the measurement reporting unit 243) which are included in the control unit 240 described with reference to FIG. Z may also be mounted in the wireless communications interface 933. Alternatively, at least some of the constituent elements may be mounted in the processor 921. As one example, the car navigation apparatus 920 may incorporate a module that includes part (for example, the BB processor 934) or all of the wireless communications interface 933 and/or the processor 921. One or more of the foregoing constituent elements may also be mounted in the module. In this case, the module may store a program for causing a processor to function as the one or more constituent elements (in other words, a program for causing the processor to execute operations of the one or more constituent elements) and execute the program. As another example, a program for causing the processor to function as the one or more constituent elements may be installed in the car navigation apparatus 920, and the wireless communications interface 933 (for example, the BB processor 934) and/or the processor 921 may execute the program. In this way, the car navigation apparatus 920 or the module may be provided as a device including the one or more constituent elements, and a program for causing the processor to function as the one or more constituent elements may be provided. In addition, a readable recording medium on which the program is recorded may be provided.

Furthermore, in the car navigation apparatus 920 illustrated in FIG. 26, the wireless communications unit 220 described with reference to FIG. 12, for example, may also be mounted in the wireless communications interface 933 (for example, the RF circuit 935). Further, the antenna unit 210 may be mounted in the antenna 937. Further, the storage unit 230 may be mounted in the memory 922.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and breakdown information, and outputs the generated data to the in-vehicle network 941.

5. Conclusion

One embodiment of the present disclosure has been described hereinabove with reference to FIGS. 1 to 26. As described hereinabove, the terminal device 200 according to the present embodiment acquires resource pool allocation information and transmit power-related information when performing communication using any communication method classified as V2X communication and determines transmit beam-related parameters on the basis of this information. Transmit power-related information is information relating to the transmit power of the transmit beam which the terminal device 200 uses when performing V2X communication. That is, in the present embodiment, the parameters for communication using a transmit beam in a sidelink are determined on the basis of transmit power-related information that corresponds to the transmit power used. Thus, even in cases where beamforming technology is used in sidelink communication, it is possible to suppress the interference to the interference protection target exerted by the transmit beam of the terminal device 200.

While the preferred embodiments of the present disclosure have been described in detail above with reference to the accompanying drawings, the technical scope of the present disclosure is not limited to or by such examples. It will be apparent to those skilled in the art of the present disclosure that various modifications and alterations can be conceived within the scope of the technical ideas described in the claims and that such modifications and alterations are naturally understood to fall within the technical scope of the present disclosure.

For example, although V2X communication has been described by way of an example in the foregoing embodiment, application targets for this technology are not limited to V2X communication. Because the present technology constitutes a sidelink enhancement, same may be applied to sidelink communication use cases. For example, this technology is also applicable to D2D communication and MTC communication. Moreover, this technology is also applicable to moving cells and relay communication.

Furthermore, the foregoing first to sixth interference suppression processing may also be suitably combined. For example, by combining any one of the first to third interference suppression processing with any one of the fourth to sixth interference suppression processing, it is possible to suppress interference to each of the base station 100 and peripheral terminal 200.

In addition, the processing described with reference to the flowcharts and sequence diagrams in the present specification is not necessarily executed in the illustrated order. Several processing steps may be also executed in parallel. Moreover, additional process steps may be adopted, and some process steps may be omitted.

Furthermore, the advantageous effects described in this specification are merely illustrative or exemplified advantageous effects, and are non-limiting. That is, the technology according to the present disclosure can afford other advantageous effects that would be apparent to a person skilled in the art from the description of the present specification in addition to or instead of the foregoing advantageous effects.

Note that the following configurations come under the technical scope of the present disclosure.

(1)

A terminal device capable of communication using any communication method classified as vehicle-to-x (V2X), comprising:

an acquisition unit that acquires first information relating to allocation of a resource pool that can be used by a plurality of terminal devices using the communication method and second information relating to transmit power which is associated with a beam ID of one or a plurality of transmit beams which the terminal devices use in communication using the communication method;

a parameter determination unit that determines parameters relating to the transmit beams on a basis of the first information and the second information; and a transmission processing unit that performs packet transmission processing using the communication method on a basis of the determined parameters.

(2)

The terminal device according to (1), wherein the second information includes information relating to gain with respect to an interference protection target which is obtained due to the transmit beam.

(3)

The terminal device according to (2), wherein the information relating to gain is determined on a basis of a maximum gain value which is configured for the transmit beam which the terminal device uses for transmission to another terminal device.

(4)

The terminal device according to (2) or (3), wherein the information relating to gain is determined on a basis of a maximum gain value which is configured for the transmit beam which the terminal device uses for transmission to the interference protection target.

(5)

The terminal device according to any one of (2) to (4), wherein the information relating to gain is determined on a basis of an average value for the gain of the transmit beam which is used by the terminal device in a predetermined time interval.

(6)

The terminal device according to any one of (2) to (5), wherein the information relating to gain is determined on a basis of a relative positional relationship between the terminal device and the interference protection target.

(7)

The terminal device according to any one of (2) to (6), wherein the information relating to gain includes information relating to a first gain specific to the terminal device and information relating to a second gain specific to a cell.

(8)

The terminal device according to (7), wherein the information relating to the first gain is determined on a basis of a table which is configured individually for the terminal device.

(9)

The terminal device according to (7) or (8), wherein the information relating to the second gain is determined on a basis of a distance in a frequency direction between a sidelink resource and an uplink resource in the resource pool.

(10)

The terminal device according to any one of (1) to (9), wherein the second information includes information relating to a distance in a frequency direction between a sidelink resource and an uplink resource in the resource pool.

(11)

The terminal device according to any one of (1) to (10), wherein the acquisition unit also acquires third information which is determined on a basis of an effect of the transmit beam of the terminal device on the interference protection target, and the parameter determination unit determines the parameters relating to the transmit beams also on a basis of the third information.

(12)

The terminal device according to (11), wherein the third information includes measurement results-based information of the interference protection target regarding interference due to the communication by the communication method using the transmit beam that has been performed between the terminal device and another terminal device.

(13)

The terminal device according to (12), wherein the third information includes at least one of information indicating that a predetermined interference amount has been exceeded, information for transmit power control, a request to modify the transmit beam used, a request to stop beamforming, a request to modify resources used, and a report regarding modification of the resource pool.

(14)

The terminal device according to (12) or (13), wherein the third information includes at least one of a time-frequency resource for which interference has occurred or which is being used by the interference protection target, the measurement results, position information of the terminal device or the interference protection target, and a direction of travel of the terminal device or the interference protection target.

(15)

The terminal device according to any one of (11) to (14), wherein the third information includes measurement results-based information for the interference protection target of a measurement signal which is subjected to beam sweeping by the terminal device.

(16)

The terminal device according to any one of (1) to (15), wherein the acquisition unit also acquires fourth information which is determined on a basis of an effect of the transmit beam of another terminal device on the interference protection target, and the parameter determination unit determines the parameters relating to the transmit beams also on a basis of the fourth information.

(17)

The terminal device according to (16), wherein the fourth information is measurement results-based information of the interference protection target regarding interference due to the communication by the communication method using the transmit beam that has been performed between other terminal devices.

(18)

The terminal device according to (17), wherein the fourth information includes at least one of information indicating that a predetermined interference amount has been exceeded, information for transmit power control, a request to modify the transmit beam used, a request to modify a resource used, a time-frequency resource for which interference has occurred, the measurement results, position information of the interference protection target and the other terminal device which is a source of interference, and a direction of travel of the interference protection target and the other terminal device which is a source of interference.

(19)

A method that is executed by a terminal device capable of communication using any communication method classified as V2X communication, the method comprising:

acquiring first information relating to allocation of a resource pool that can be used by a plurality of terminal devices using the communication method and second information relating to transmit power which is associated with a beam ID of one or a plurality of transmit beams which the terminal devices use in communication using the communication method;

determining parameters relating to the transmit beams on the basis of the first information and the second information; and performing packet transmission processing using the communication method on the basis of the determined parameters.

(20)

A recording medium on which is recorded a program for causing a computer, which controls a terminal device capable of communication using any communication method classified as V2X communication, to function as:

an acquisition unit that acquires first information relating to allocation of a resource pool that can be used by a plurality of terminal devices using the communication method and second information relating to transmit power which is associated with a beam ID of one or a plurality of transmit beams which the terminal devices use in communication using the communication method;

a parameter determination unit that determines parameters relating to the transmit beams on the basis of the first information and the second information; and a transmission processing unit that performs packet transmission processing using the communication method on the basis of the determined parameters.

REFERENCE SIGNS LIST

1 SYSTEM
100 BASE STATION
110 ANTENNA UNIT
120 WIRELESS COMMUNICATIONS UNIT
130 NETWORK COMMUNICATIONS UNIT
140 STORAGE UNIT
150 CONTROL UNIT
151 MEASUREMENT REPORTING UNIT
152 COMMUNICATIONS CONTROL UNIT
200 TERMINAL DEVICE
210 ANTENNA UNIT
220 WIRELESS COMMUNICATIONS UNIT
230 STORAGE UNIT
240 CONTROL UNIT
241 ACQUISITION UNIT
242 PARAMETER DETERMINATION UNIT
243 TRANSMISSION PROCESSING UNIT
244 MEASUREMENT REPORTING UNIT

The invention claimed is:

1. A terminal device capable of performing a vehicle-to-everything (V2X) communication method, the terminal device comprising:

a transceiver; and control circuitry configured to:

acquire first information relating to an allocation of a resource pool that can be used by a plurality of terminal devices using the V2X communication method and second information relating to a transmit power which is associated with a beam ID of one transmit beam or a plurality of transmit beams which one or more of the plurality of terminal devices use in communication using the V2X communication method;

determine parameters relating to the one transmit beam or the plurality of transmit beams based on the first information and the second information; and perform packet transmission processing using the V2X communication method based on the determined parameters, wherein the second information includes one of:
information relating to a gain with respect to an interference protection target which is obtained due to the one transmit beam or the plurality of transmit beams, or information relating to a distance in a frequency direction between a sidelink resource and an uplink resource in the resource pool.

2. The terminal device according to claim 1, wherein the information relating to the gain is determined based on a maximum gain value which is configured for the one transmit beam or the plurality of transmit beams which the terminal device uses for transmission to another terminal device.

3. The terminal device according to claim 1, wherein the information relating to the gain is determined based on a maximum gain value which is configured for the one transmit beam or the plurality of transmit beams which the terminal device uses for transmission to the interference protection target.

4. The terminal device according to claim 1, wherein the information relating to the gain is determined based on an average value for the gain of the one transmit beam or the plurality of transmit beams which is used by the terminal device in a predetermined time interval.

5. The terminal device according to claim 1, wherein the information relating to the gain is determined based on a relative positional relationship between the terminal device and the interference protection target.

6. The terminal device according to claim 1, wherein the information relating to the gain includes information relating to a first gain specific to the terminal device and information relating to a second gain specific to a cell.

7. The terminal device according to claim 6, wherein the information relating to the first gain is determined based on a table which is configured individually for the terminal device.

8. The terminal device according to claim 6, wherein the information relating to the second gain is determined based on a distance in a frequency direction between a sidelink resource and an uplink resource in the resource pool.

9. The terminal device according to claim 1, wherein the control circuitry is further configured to:
acquire third information which is determined based on an effect of the one transmit beam or the plurality of transmit beams of the terminal device on the interference protection target, and determine the parameters relating to the one transmit beam or the plurality of transmit beams also based on the third information.

10. The terminal device according to claim 9, wherein the third information includes measurement results-based information of the interference protection target regarding interference due to the communication by the V2X communication method using the one transmit beam or the plurality of transmit beams that has been performed between the terminal device and another terminal device.

11. The terminal device according to claim 10, wherein the third information includes at least one of information indicating that a predetermined interference amount has been exceeded, information for transmit power control, a request to modify the one transmit beam or the plurality of transmit beams used, a request to stop beamforming, a request to modify resources used, and a report regarding modification of the resource pool.

12. The terminal device according to claim 10, wherein the third information includes at least one of a time-frequency resource for which interference has occurred or which is being used by the interference protection target, the measurement results, position information of the terminal device or the interference protection target, and a direction of travel of the terminal device or the interference protection target.

13. The terminal device according to claim 9, wherein the third information includes measurement results-based information for the interference protection target of a measurement signal which is subjected to beam sweeping by the terminal device.

14. The terminal device according to claim 1, wherein the control circuitry is further configured to:
acquire fourth information which is determined based on an effect of the one transmit beam or the plurality of transmit beams of another terminal device on the interference protection target, and determine the parameters relating to the one transmit beam or the plurality of transmit beams also based on the fourth information.

15. The terminal device according to claim 14, wherein the fourth information is measurement results-based information of the interference protection target regarding interference due to the communication by the V2X communication method using the one transmit beam or the plurality of transmit beams that has been performed between other terminal devices.

16. The terminal device according to claim 15, wherein the fourth information includes at least one of information indicating that a predetermined interference amount has been exceeded, information for transmit power control, a request to modify the one transmit beam or the plurality of transmit beams used, a request to modify a resource used, a time-frequency resource for which interference has occurred, the measurement results, position information of the interference protection target and the other terminal device which is a source of interference, and a direction of travel of the interference protection target and the other terminal device which is a source of interference.

17. A method that is executed by a terminal device capable of performing a vehicle-to-everything (V2X) communication method, the method comprising:
acquiring first information relating to an allocation of a resource pool that can be used by a plurality of terminal devices using the V2X communication method and second information relating to a transmit power which is associated with a beam ID of one transmit beam or a plurality of transmit beams which one or more of the plurality of terminal devices use in communication using the V2X communication method;

determining parameters relating to the one transmit beam or the plurality of transmit beams on the basis of the first information and the second information; and performing packet transmission processing using the V2X communication method on the basis of the determined parameters, wherein the second information includes one of:
information relating to a gain with respect to an interference protection target which is obtained due to the one transmit beam or the plurality of transmit beams, or
information relating to a distance in a frequency direction between a sidelink resource and an uplink resource in the resource pool.

18. A non-transitory recording medium on which is recorded a program for causing a computer, which controls a terminal device capable of performing a vehicle-to-everything (V2X) communication method, to perform a method comprising:
acquiring first information relating to an allocation of a resource pool that can be used by a plurality of terminal devices using the V2X communication method and second information relating to a transmit power which is associated with a beam ID of one transmit beam or a plurality of transmit beams which one or more of the plurality of terminal devices use in communication using the V2X communication method;
determining parameters relating to the one transmit beam or the plurality of transmit beams on the basis of the first information and the second information; and
performing packet transmission processing using the V2X communication method on the basis of the determined parameters,
wherein the second information includes one of:
information relating to a gain with respect to an interference protection target which is obtained due to the one transmit beam or the plurality of transmit beams, or
information relating to a distance in a frequency direction between a sidelink resource and an uplink resource in the resource pool.

* * * * *